(12) United States Patent
Nakao et al.

(10) Patent No.: US 7,693,033 B2
(45) Date of Patent: Apr. 6, 2010

(54) MULTIPLE ACCESS METHOD AND RADIO APPARATUS UTILIZING THE SAME

(75) Inventors: Seigo Nakao, Gifu (JP); Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1075 days.

(21) Appl. No.: 10/742,973

(22) Filed: Dec. 23, 2003

(65) Prior Publication Data

US 2004/0137906 A1 Jul. 15, 2004

(30) Foreign Application Priority Data

Dec. 27, 2002 (JP) ............................. 2002-379836
Nov. 7, 2003 (JP) ............................. 2003-377902

(51) Int. Cl.
*H04J 9/00* (2006.01)
(52) U.S. Cl. ........................ 370/204; 370/339; 370/437; 370/462; 455/102
(58) Field of Classification Search ................ 370/310, 370/341, 329, 203, 344, 395.41, 395.4, 395.43, 370/370, 369, 376, 204, 339, 437, 462; 455/102
See application file for complete search history.

(56) References Cited

U.S. PATENT DOCUMENTS

| | | | | |
|---|---|---|---|---|
| 6,178,330 | B1 * | 1/2001 | Alberty et al. | 455/452.2 |
| 6,240,098 | B1 * | 5/2001 | Thibault et al. | 370/431 |
| 6,694,100 | B1 * | 2/2004 | Fatehi et al. | 398/99 |
| 6,839,574 | B2 * | 1/2005 | Petrus et al. | 455/562.1 |
| 6,870,808 | B1 * | 3/2005 | Liu et al. | 370/203 |
| 6,967,937 | B1 * | 11/2005 | Gormley | 370/330 |
| 7,050,480 | B2 * | 5/2006 | Ertel et al. | 375/141 |
| 7,433,693 | B2 * | 10/2008 | Sheynblat | 455/456.1 |
| 7,460,835 | B1 * | 12/2008 | Petrus | 455/67.11 |
| 7,536,205 | B2 * | 5/2009 | Van Rensburg et al. | 455/562.1 |

(Continued)

FOREIGN PATENT DOCUMENTS

JP 07-087011 3/1995

(Continued)

OTHER PUBLICATIONS

Dynamic Slot Allocation (DSA) in Indoor; SDMA/TDMA Using a Smart Antenna Basestation; Faisal Shad, Terence D. Todd, Member, IEEE, Vytas Kezys, and John Litva, Fellow, IEEE; IEEE/ACM Transactions on Networking, vol. 9, No. 1, Feb. 2001.*

(Continued)

*Primary Examiner*—Salman Ahmed
(74) *Attorney, Agent, or Firm*—McDermott Will & Emery LLP

(57) ABSTRACT

Radio frequency signals are transmission-reception processed by N antennas. A radio unit performs a frequency translation processing, an amplification processing and an A-D or D-A conversion processing between a baseband signal and the radio frequency signal. A signal processing unit performs a signal processing necessary for the transmission/receiving processing by adaptive array antennas. A modem unit performs modulation/demodulation processings. A baseband unit serves as interface with a network. A control unit controls timings, channel allocation and the like of the radio unit, the signal processing unit, the modem unit and the baseband unit.

8 Claims, 21 Drawing Sheets

U.S. PATENT DOCUMENTS

| | | | | |
|---|---|---|---|---|
| 2002/0052462 | A1* | 5/2002 | Masuda et al. | 528/275 |
| 2002/0059420 | A1* | 5/2002 | Lin et al. | 709/224 |
| 2004/0022177 | A1* | 2/2004 | Awad et al. | 370/204 |
| 2004/0042387 | A1* | 3/2004 | Geile | 370/206 |
| 2004/0141478 | A1* | 7/2004 | Kasapi et al. | 370/329 |
| 2005/0041611 | A1* | 2/2005 | Sandhu | 370/319 |
| 2005/0231425 | A1* | 10/2005 | Coleman et al. | 342/385 |

FOREIGN PATENT DOCUMENTS

| | | |
|---|---|---|
| JP | 10-313274 | 11/1998 |
| JP | 11-069431 | 3/1999 |
| JP | 11-313364 | 11/1999 |
| JP | 2001-54164 | 2/2001 |
| JP | 2001-054164 A | 2/2001 |
| JP | 2001-507889 | 6/2001 |
| JP | 2001-507889 A | 6/2001 |
| JP | 2002-198933 | 7/2002 |
| JP | 2002-198933 A | 7/2002 |
| JP | 2002-291038 | 10/2002 |
| JP | 2002-291038 A | 10/2002 |
| JP | 2004-501549 | 1/2004 |
| JP | 2005-514801 | 5/2005 |
| WO | WO98/30047 | 7/1998 |
| WO | WO 01/89099 A2 | 11/2001 |
| WO | WO 02/093782 A1 | 11/2002 |

OTHER PUBLICATIONS

A Combined OFDM/SDMA Approach; Patrick Vandenameele, Student Member, IEEE, Liesbet Van Der Perre, Marc G. E. Engels, Member, IEEE, Bert Gyselinckx, and Hugo J. De Man, Fellow, IEEE; IEEE Journal on Selected Areas in Communications, vol. 18, No. 11, Nov. 2000.*

Performance of Space-Division Multiple-Access; (SDMA) With Scheduling; Hujun Yin, Member, IEEE, and Hui Liu, Member, IEEE; IEEE Transactions on Wireless Communications, vol. 1, No. 4, Oct. 2002.*

Adaptive Resource Allocation in SDMA-based Wireless Broadband Networks with OFDM Signaling; Iordanis Koutsopoulos and Leandros Tassiulas; Department of Electrical & Computer Engineering and Institute for Systems Research University of Maryland, College Park, MD 20742, USA; IEEE Infocom 2002.*

European Search Report issued Feb. 24, 2006 for corresponding European Patent Application No. 05023884.9.

Yin H, et al. "Performance of Space-Division Multiple-Access (SDMA) with Scheduling" IEEE Transactions on Wireless Communications, IEEE, Piscataway, US vol. 1, No. 4, Oct. 2002, pp. 611-618, XP001144242.

Hara Y et al., "Time Slot Assignment for Cellular SDMA/TDMA Systems with Antenna Arrays" VCT 2001 Spring. IEEE VTS 53rd. Vehicular Technology Conference. Rhodes, Greece, May 6-9, 2001, IEEE Vehicular Technology Conference, New York NY: IEEE, US vol. 2 of 4 Conf. 53, May 6, 2001, pp. 877-880, XP001067086.

Yunjian Jia et al: "Performance of TDD-SDMA/TDMA system with multi-slot assignment in asymmetric traffic wireless network" vol. 5, Sep. 15, 2002, pp. 2317-2321, XP010614142.

Shad F et al.: "Dynamic slot allocation (DSA) in indoor SDMA/TDMA using a smart antenna basestation" IEEE/ACM Transactions on Networking IEEE Inc. New York, US vol. 9, No. 1, Feb. 1, 2001, pp. 69-81 XP001017556.

Office Action dated May 19, 2006.

Japanese Office Action, with English Translation, issued in Japanese Patent Application No. 2005-054637, dated on Dec. 4, 2007.

European Office Action, issued in European Patent Application No. EP 05023884.9-2412 dated on Sep. 16, 2008.

Japanese Office Action, with English Translation, issued in Japanese Patent Application No. JP 2005-054637, dated May 13, 2008.

* cited by examiner

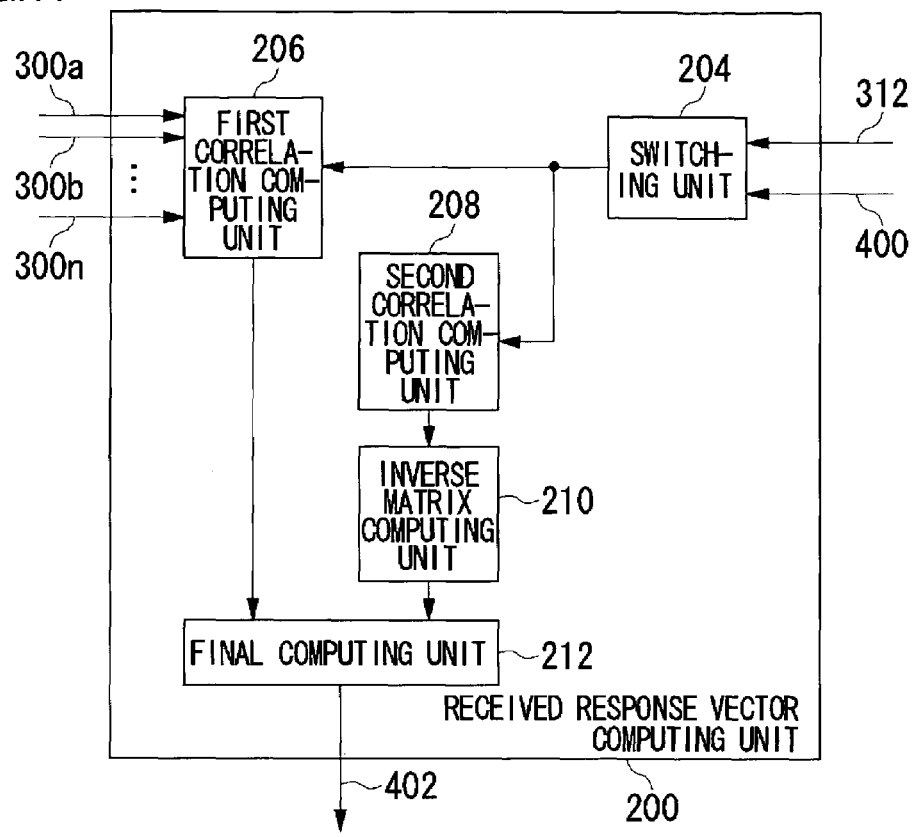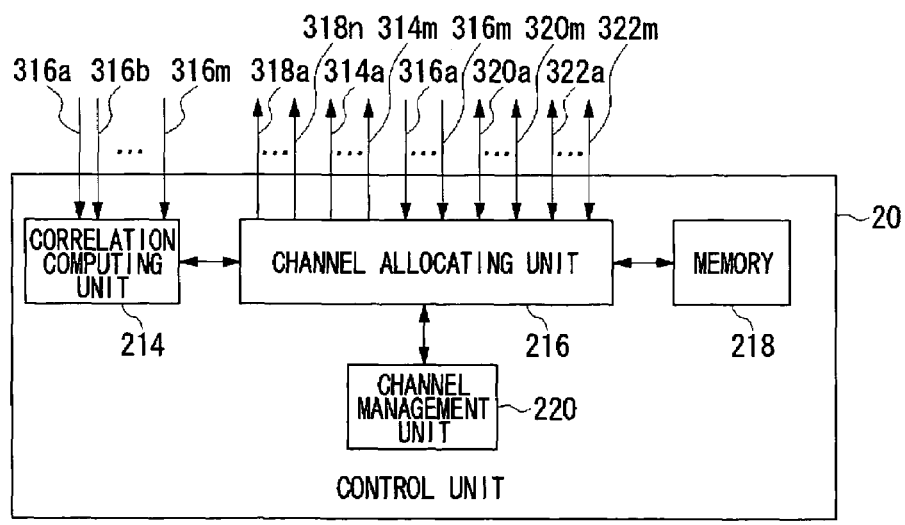

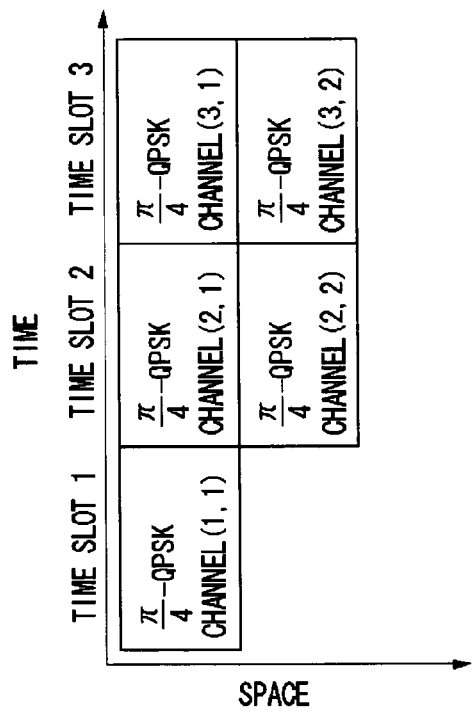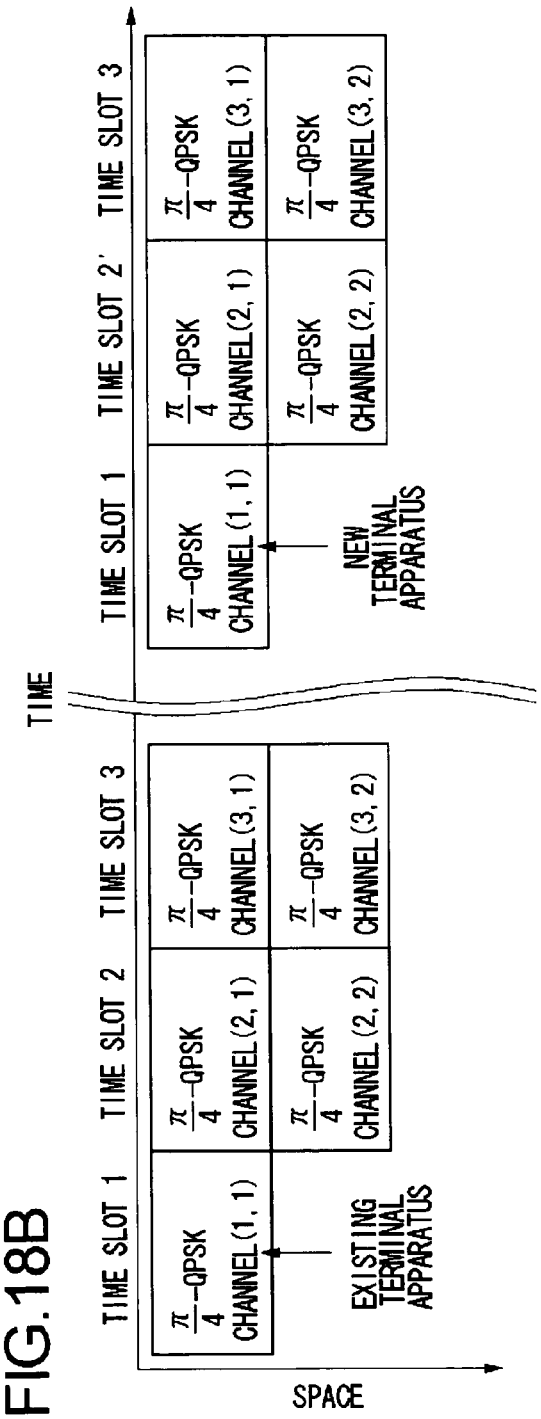

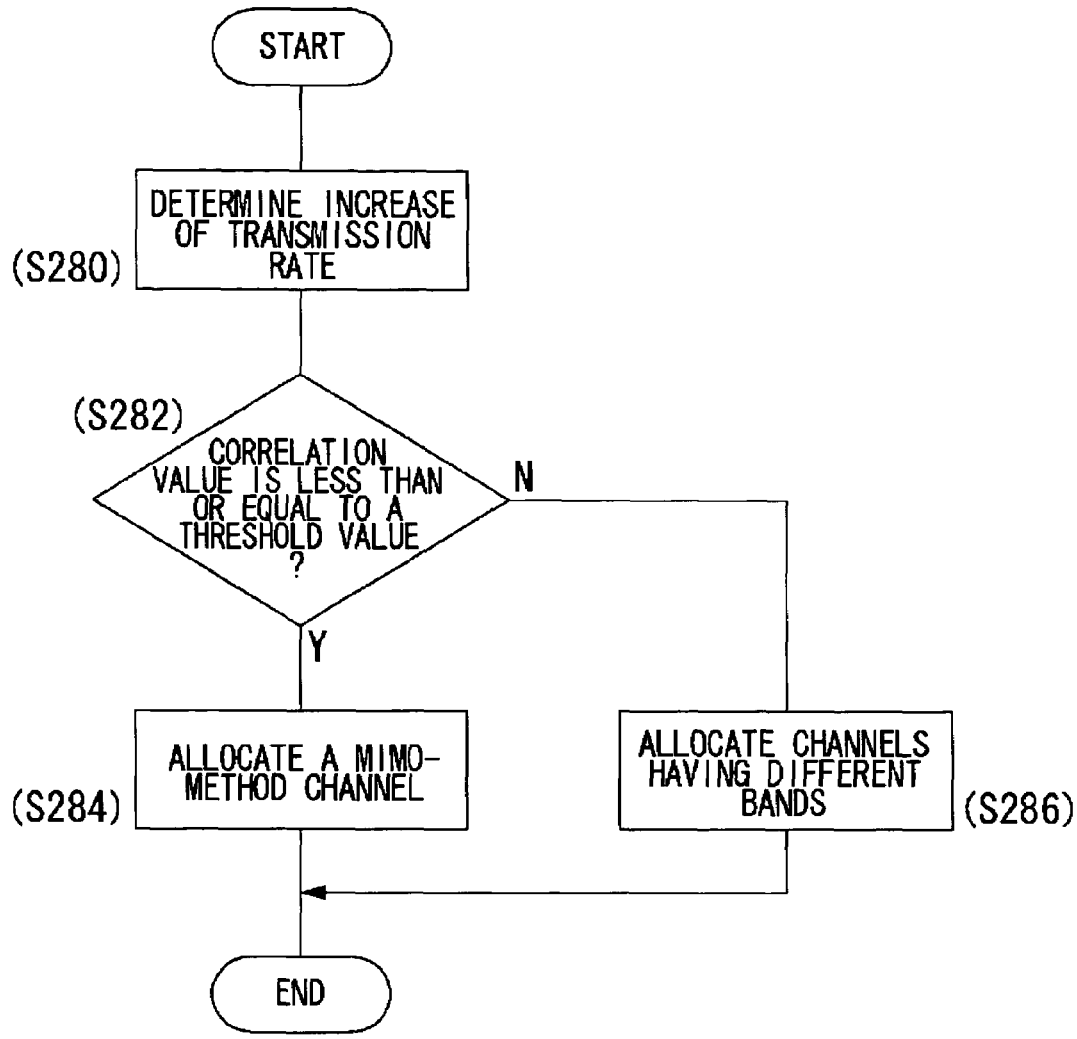

MULTIPLE ACCESS METHOD AND RADIO APPARATUS UTILIZING THE SAME

BACKGROUND OF THE INVENTION

1. Field of the Invention

The present invention relates to the multiple access technologies and the wireless technologies utilizing the multiple access technology, and it particularly relates to a multiple access method and a radio apparatus utilizing the multiple access method in order to multiple-connect a plurality of terminal apparatuses by partitioning the space.

2. Description of the Related Art

In wireless communication, multiple access technologies are being used in order to realize effective use of frequency resources. Such multiple access technologies include FDMA (Frequency Division Multiple Access), TDMA (Time Division Multiple Access) and CDMA (Code Division Multiple Access). In recent years, the widespread use of cellular phones and other circumstances are adding demands for even higher efficiency in the use of radio frequencies. And as one way of solving this problem, new multiple access technologies, which include SDMA (Space Division Multiple Access) and PDMA (Path Division Multiple Access), are now being investigated.

In SDMA, for example, a time slot for the same frequency is divided into a plurality of spatial divisions at a radio base station apparatus, and data transmission is performed with user terminals to which the divided spaces are allocated. The signals to be used by the respective user terminals are generally separated by a mutual interference eliminating means, such as an adaptive array antenna, installed at the radio base station apparatus (see, for example, the Relate Art List (1) below). The adaptive array antenna synthesizes signals received by a plurality of antennas by weighting them with weight vectors according to their respective propagation environments before outputting signals on a desired user terminal.

RELATED ART LIST (1) Japanese Patent Application Laid-Open No. Hei11-313364.

Researches are being conducted into technologies capable of raising data transmission rate without compromising data transmission quality while ensuring equal occupied bandwidth of data for user terminals. One such technology, whose application to TDMA and the like is being investigated, is an adaptive modulation technology for changing data transmission rate, which can be defined by modulation methods, such as QPSK (Quadrature Phase Shift Keying) or 16 QAM (16 Quadrature Amplitude Modulation), in response to changes in the propagation environment, including fading, and the error correction coding rate. When this adaptive modulation technique is applied to SDMA, however, it is possible that any defective division of space by an adaptive array antenna gives rise to interference between a plurality of user terminals. And as a result of this interference, data transmission quality of user terminals, especially those in connection with the radio base station at high transmission rates, suffers degradation.

SUMMARY OF THE INVENTION

The present invention has been made in recognition of the foregoing circumstances and an object thereof is to provide a multiple access method capable of reducing the degradation of data transmission quality of terminal apparatuses using high data transmission rates in SDMA and a radio apparatus utilizing the same. Another object thereof is to provide a multiple access method capable of increasing or decreasing the data transmission rate of terminal apparatuses while reducing the degradation of data transmission quality caused by SDMA and a radio apparatus utilizing the same. Still another object thereof is to provide a multiple access method capable of improving the possibility of access by terminal apparatuses that require access at a high data transmission rate and a radio apparatus utilizing the same. Still another object thereof is to provide a multiple access method usable where the degradation of data transmission quality caused by SDMA is significant and a radio apparatus utilizing the same.

A preferred embodiment according to the present invention relates to a radio apparatus. This apparatus includes: a control unit which allocates channels respectively for a plurality of terminal apparatuses to be multiple accessed, by partitioning a space; and a signal processing unit which performs a data transmission processing on the terminal apparatuses allocated respectively for the channels. In this radio apparatus, the control unit may determine the access permission number in the terminal apparatus based on the space partition, in accordance with a data transmission rate of the terminal apparatus.

The "access permission number" means the number, the maximum number in particular, of terminal apparatuses with which the connection is permitted by the radio apparatus.

The control unit may determine the access permission number in such a manner that it is set smaller as the data transmission rate of the terminal apparatus becomes higher.

There are arranged a plurality of channels to which the plurality of terminal apparatuses are respectively allocated within a plurality of slots which are provided by further partitioning a multiplexing factor other than the space, and the control unit may include: an input unit which inputs a request by which to change a data transmission rate of a predetermined terminal apparatus; and a channel allocating unit which instructs a change of the data transmission rate in a request-applied terminal apparatus and which relocates the channels among different slots so that the number of channels allocated within the respective slots is less than or equal to the access permission number even if the data transmission rate in the request-applied terminal apparatus has been changed.

There are arranged a plurality of channels to which the plurality of terminal apparatuses are respectively allocated within a plurality of slots which are provided by further partitioning a multiplexing factor other than the space, and the control unit may include: a channel allocating unit which relocates the channels among different slots in a manner such that the number of channels is nonuniform among the different slots while the number of channels allocated within the respective slots is set to less than or equal to the access permission number.

That "number of channels is nonuniform" includes also a case where the data transmission rate computed from the number of channels allocated differs among the slots, in addition to the case where the number of channels allocated differs among the slots.

The signal processing unit may compute a received response characteristic, based on a signal received from the terminal apparatus, and the control unit may include: a correlation computing unit which computes a value of correlation between received response characteristics corresponding to the plurality of terminal apparatus to be multiple accessed by partitioning the space; and a channel allocating unit which multiple-accesses the plurality of terminal apparatuses, within a range of the access permission number, by partitioning the space if the value of correlation is less than or equal to a threshold value and which multiple-accesses the plurality of terminal apparatuses by partitioning a multiplexing factor other than the space if the value of correlation is greater than the threshold value.

The "response characteristic" includes the response characteristic which is transformed based on a predetermined rule such as complex conjugation or linear transformation, and further includes a weighting factor such as a weight vector.

By implementing the above apparatus, the permitted number of access multiplexed by space partition is determined according to the data transmission rate and then the channels are allocated based on the thus determined access permission number, so that the degradation of data transmission quality due to the interference can be reduced.

Another preferred embodiment according to the present invention relates to a multiple-access method. This method determines the maximum number of terminal apparatus to be multiple-accessed to a base station apparatus by partitioning a space, according a data transmission rate of the terminal apparatus.

Still another preferred embodiment according to the present invention relates also to a multiple-access method. This method includes: allocating channels respectively for a plurality of terminal apparatuses to be multiple accessed, by partitioning a space; and performing a data transmission processing on the terminal apparatuses allocated respectively for the channels. In this method, the allocating may determine the access permission number in the terminal apparatus based on the space partition, in accordance with a data transmission rate of the terminal apparatus.

The allocating may determine the access permission number in such a manner that the access permission number is set smaller as the data transmission rate of the terminal apparatus becomes higher.

There are arranged a plurality of channels to which the plurality of terminal apparatuses are respectively allocated within a plurality of slots which are provided by further partitioning a multiplexing factor other than the space, and the allocating may include: inputting a request by which to change a data transmission rate of a predetermined terminal apparatus; and instructing a change of the data transmission rate in a request-applied terminal apparatus and relocating the channels among different slots so that the number of channels allocated within the respective slots is less than or equal to the access permission number even if the data transmission rate in the request-applied terminal apparatus has been changed.

There are arranged a plurality of channels to which the plurality of terminal apparatuses are respectively allocated within a plurality of slots which are provided by further partitioning a multiplexing factor other than the space, and the allocating may include: relocating the channels among different slots in a manner such that the number of channels is nonuniform among the different slots while the number of channels allocated within the respective slots is set to less than or equal to the access permission number.

The performing a data transmission processing may compute a received response characteristic, based on a signal received from the terminal apparatus, and the allocating may include: computing a value of correlation between received response characteristics corresponding to the plurality of terminal apparatus to be multiple accessed by partitioning the space; and multiple-accessing the plurality of terminal apparatuses, within a range of the access permission number, by partitioning the space if the value of correlation is less than or equal to a threshold value and multiple-accessing the plurality of terminal apparatuses by partitioning a multiplexing factor other than the space if the value of correlation is greater than the threshold value.

Still another preferred embodiment according to the present invention relates to a program. This program includes the functions of: allocating channels respectively for a plurality of terminal apparatuses to be multiple accessed, by partitioning a space; and performing a data transmission processing on the terminal apparatuses allocated respectively for the channels. In this program, the allocating determines the access permission number in the terminal apparatus based on the space partition, in accordance with a data transmission rate of the terminal apparatus.

The allocating may determine the access permission number in such a manner that the access permission number is set smaller as the data transmission rate of the terminal apparatus becomes higher.

There are arranged a plurality of channels to which the plurality of terminal apparatuses are respectively allocated within a plurality of slots which are provided by further partitioning a multiplexing factor other than the space, and the allocating may include: inputting a request by which to change a data transmission rate of a predetermined terminal apparatus; and instructing a change of the data transmission rate in a request-applied terminal apparatus and relocating the channels among different slots so that the number of channels allocated within the respective slots is less than or equal to the access permission number even if the data transmission rate in the request-applied terminal apparatus has been changed.

There are arranged a plurality of channels to which the plurality of terminal apparatuses are respectively allocated within a plurality of slots which are provided by further partitioning a multiplexing factor other than the space, and the allocating may include: relocating the channels among different slots in a manner such that the number of channels is nonuniform among the different slots while the number of channels allocated within the respective slots is set to less than or equal to the access permission number.

In the program, the performing a data transmission processing may compute a received response characteristic, based on a signal received from the terminal apparatus, and the allocating may include: computing a value of correlation between received response characteristics corresponding to the plurality of terminal apparatus to be multiple accessed by partitioning the space; and multiple-accessing the plurality of terminal apparatuses, within a range of the access permission number, by partitioning the space if the value of correlation is less than or equal to a threshold value and multiple-accessing the plurality of terminal apparatuses by partitioning a multiplexing factor other than the space if the value of correlation is greater than the threshold value.

Still another preferred embodiment according to the present invention relates to a radio apparatus. This apparatus includes: a control unit which allocates respectively a plurality of channels obtained by partitioning a space for a predetermined terminal apparatus; and a signal processing unit which performs a data transmission processing on the terminal. In this apparatus, the control unit may determine the set-up number of channels to be allocated to the terminal, in accordance with a data transmission rate of the terminal apparatus. The "set-up number" means the number, the maximum number in particular, of channels allocated to the radio apparatus.

By implementing the above apparatus, the set-up number of channels allocated by space partition is determined according to the data transmission rate per channel, so that the degradation of data transmission quality due to the interference can be reduced.

The control unit may determine the set-up number in such a manner that the set-up number is set smaller as the data transmission rate of the terminal apparatus becomes higher. There are arranged a plurality of channels, which are allocated to the terminal apparatus, within a plurality of bands which are provided by further partitioning a channel allocating factor other than the space, and control unit may include: a decision unit which determines a change of a data transmission rate of the terminal apparatus; and a channel allocating unit which relocates the channels among different bands so that the number of channels allocated within the respective bands is less than or equal to the set-up number even if the data transmission rate in the terminal apparatus has been changed.

Similar to "channel", the "band" is a wireless communication path set to perform the communication between wireless apparatuses such as a base station apparatus and a terminal apparatus. Specifically, the "band" indicates a specific frequency band, a specific time slot (or slot) and a specific code series in the case of FDMA (Frequency Division Multiple Access), TDMA (Time Division Multiple Access) and CDMA (Code Division Multiple Access), respectively.

The "channel allocating factor other than the space" may include. the frequency associated with FDMA, the time associated with TDMA, and those factors may be associated with CSMA (Carrier Sense Multiple Access) and so forth.

There are arranged a plurality of channels, which are allocated to the terminal apparatus, within a plurality of bands which are provided by further partitioning a channel allocating factor other than the space, the control unit may include: a channel allocating unit which relocates the channels among different bands in a manner such that the number of channels is nonuniform among the different bands while the number of channels allocated within the respective bands is set to less than or equal to the set-up number.

The signal processing unit may compute a received response characteristic, based on a signal received from the terminal apparatus, and the control unit may include: a correlation computing unit which computes a value of correlation between received response characteristics corresponding to the plurality of channels that partition the space; and a channel allocating unit which allocates respectively a plurality of channels for the terminal if the value of correlation is less than or equal to a threshold value and which allocates the channels based on a channel allocating factor other than the space if the value of correlation is greater than the threshold value.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 11 shows another structure of a received response vector computing unit shown in FIG. 7.

FIG. 12 shows a structure of a control unit shown in FIG. 1.

FIGS. 18A and 18B show allotments of channels according to the procedure shown in FIG. 17.

FIG. 23 is a flowchart showing still another procedure for allocating channels according to the fifth embodiment.

DETAILED DESCRIPTION OF THE INVENTION

Figure 1:
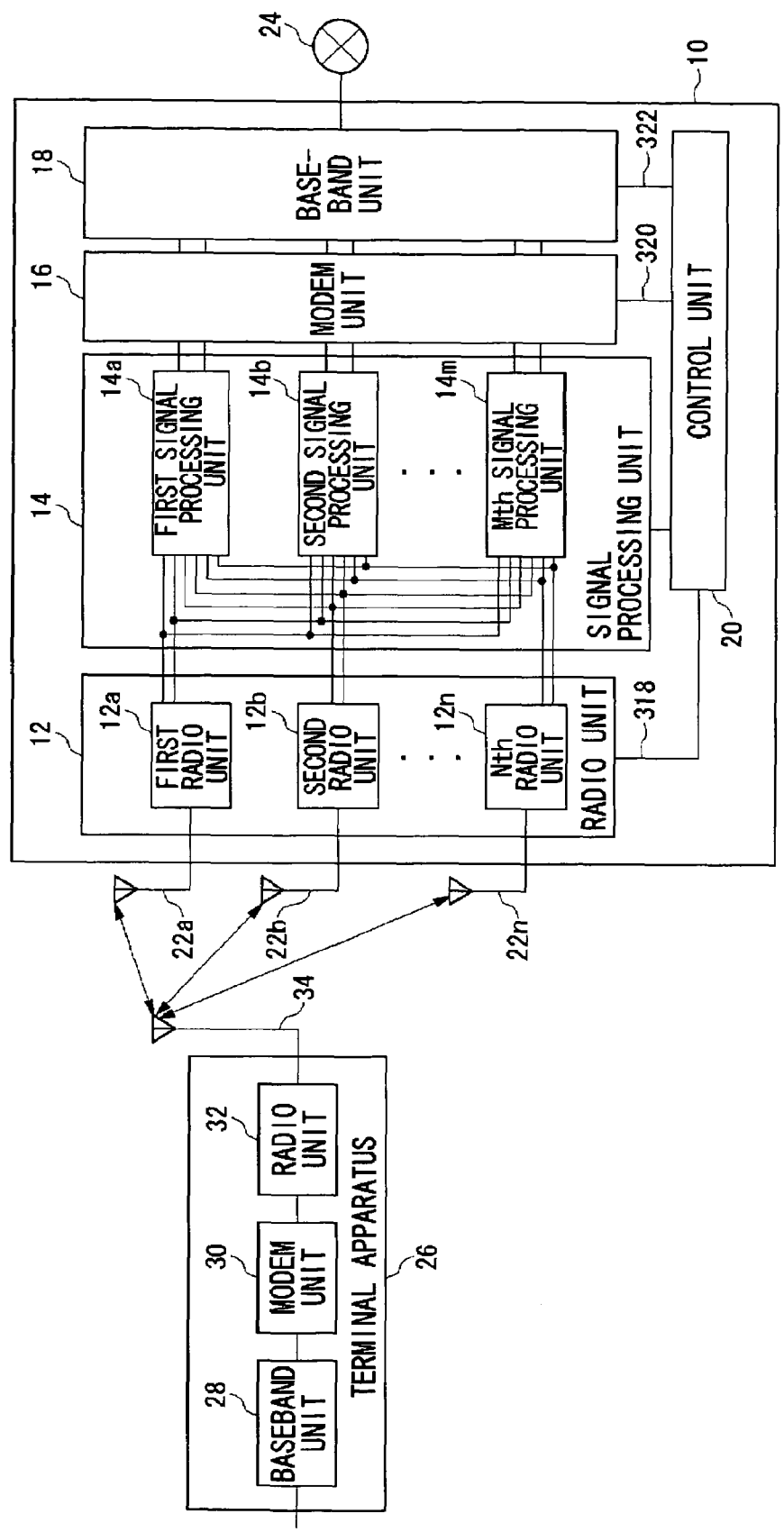
FIG. 1 shows a structure of a communication system according to a first embodiment of the present invention.

The invention will now be described based on the following embodiments which do not intend to limit the scope of the present invention but exemplify the invention. All of the features and the combinations thereof described in the embodiments are not necessarily essential to the invention.

First Embodiment

A first embodiment of the present invention relates to a radio apparatus for a base station which is in wireless connection with a plurality of terminal apparatuses by SDMA (Space Division Multiple Access). Radio signals sent from terminal apparatuses multiplexed by SDMA are, ideally speaking, respectively separated by an adaptive array antenna provided on the radio apparatus. Depending on the disposition of the plurality of terminal apparatuses in relation to the radio apparatus, however, separation of their respective radio signals cannot be done perfectly, with the result that interference generally occurs between such a plurality of terminal apparatuses. In order to raise the data transmission rate higher while reducing the drop of data transmission quality due to interference, a radio apparatus according to the present embodiment determines the number of terminal apparatuses to which permission is given for access in SDMA (hereinafter referred to as "access permission number") according to the data transmission rate of the terminal apparatuses to be connected in SDMA. That is, when the data transmission rate of the terminal apparatuses is high and therefore the drop in data transmission quality due to interference is generally large, the access permission number is made smaller with the purpose of reducing interference. On the other hand, when the data transmission rate thereof is low and therefore the drop in data transmission quality due to interference is small, the access permission number is made larger with the purpose of increasing the data transmission rate of the terminal apparatuses.

Moreover, under the circumstances where a plurality of terminal apparatuses are in multiple access to a radio apparatus by a multiplexing factor, such as TDMA, other than SDMA and when one of the plurality of terminal apparatuses connected by SDMA requests an increase in data transmission rate in one of the time slots of TDMA, a radio apparatus according to the present embodiment increases the transmission rate of an increase requesting terminal apparatus in response to the request, provided, however, that the number of terminal apparatuses connected by SDMA in the time slot including the increase requesting terminal apparatus is smaller than the access permission number even if the transmission rate of the increase requesting terminal apparatus is increased. Hereinafter, the terminal apparatus requesting an increase in data transmission rate is called the "increase requesting terminal apparatus". When the number of terminal apparatuses connected by SDMA in the time slot including the increase requesting terminal apparatus is larger than the access permission number, on the other hand, a radio apparatus according to the present embodiment increases the transmission rate of the increase requesting terminal apparatus, after shifting the connection of the other terminal apparatuses in the same time slot to which the increase requesting terminal apparatus is connected or the increase requesting terminal apparatus itself to the connection by other time slots, so that the number of terminal apparatuses connected by SDMA can become smaller than the access permission number in all the time slots.

FIG. 1 shows a communication system, which comprises a radio apparatus 10 and a terminal apparatus 26, according to the first embodiment. The radio apparatus 10 includes a first antenna 22a, a second antenna 22b, . . . and an N-th antenna 22n, which are generically called antennas 22, a radio unit 12, a signal processing unit 14, a modem unit 16, a baseband unit 18 and a control unit 20, and is connected to a network 24. The radio unit 12 includes a first radio unit 12a, a second radio unit 12b, . . . and an N-th radio unit 12n. The signal processing unit 14 includes a first signal processing unit 14a, a second signal processing unit 14b, . . . and an M-th signal processing unit 14m. The terminal apparatus 16 includes an antenna 34, a radio unit 32, a modem unit 30 and a baseband unit 28. Moreover, the radio apparatus 10 includes a radio unit control signal 318, a modem unit control signal 320 and a baseband unit control signal 322 as signals. In the communication system shown in FIG. 1, a single terminal apparatus 26 is connected to the radio apparatus 10, but a plurality of terminal apparatuses 26 may be connected thereto.

The baseband unit 18 in the radio unit 10 is an interface with the network 24, and the baseband unit 28 in the terminal apparatus 26 is an interface with a PC connected to the terminal apparatus 26 or with an application within the terminal apparatus 26. They perform transmission and receiving processings of information signals to be transmitted from and received by the communication system. They may also perform error correction or automatic retransmission processing, but the description of such processings is omitted here.

The modem unit 16 in the radio apparatus 10 and the modem unit 30 in the terminal apparatus 26 generate transmission signals through a modulation processing of modulating the carrier with information signals to be transmitted. The modulation methods used here are $\pi/4$ shift QPSK (hereinafter referred to as QPSK also), 16 QAM and 64 QAM. In a demodulation processing, received signals are demodulated so as to reproduce information signals transmitted. And, in the process, delayed detection is performed for QPSK, and coherent detection is performed for 16 QAM and 64 QAM.

The signal processing unit 14 performs signal processing that is necessary for transmission/receiving processing by an adaptive array antenna.

The radio unit 12 in the radio apparatus 10 and the radio unit 32 in the terminal apparatus 26 carry out frequency translation processing, amplification processing, A-D or D-A conversion processing and the like between the baseband signals and radio frequency signals, which are processed by the signal processing unit 14, the modem unit 16, the baseband unit 18, the baseband unit 28 and the modem unit 30.

The antenna 22 of the radio apparatus 10 and the antenna 34 of the terminal apparatus 26 perform transmission/receiving processings of signals of radio frequencies. The directivity of the antennas may be arbitrary and the number of the antenna 22 may be N.

The control unit 20 controls timings, channel allocation and so forth for the radio unit 12, the signal processing unit 14, the modem unit 16 and the baseband unit 18.

Figure 2:
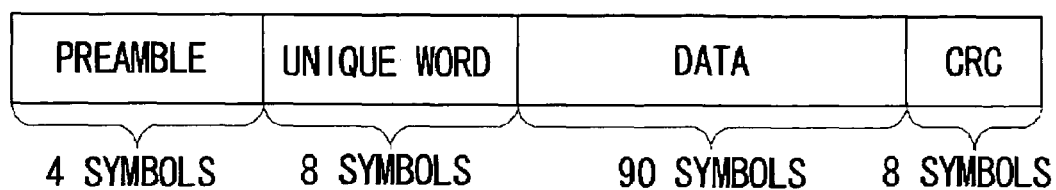
FIG. 2 shows an example of a burst format used in the first embodiment.

FIG. 2 shows a burst format for a personal handyphone system (PHS) as an example of a burst format used in the first embodiment. A preamble to be used for timing synchronization is placed in the four leading symbols of the burst, and a unique word in the subsequent 8 symbols. Since the preamble and unique word are known signals to the radio apparatus 10 and the terminal apparatus 26, they can be used as a training signal, which will be described later.

Figure 3:
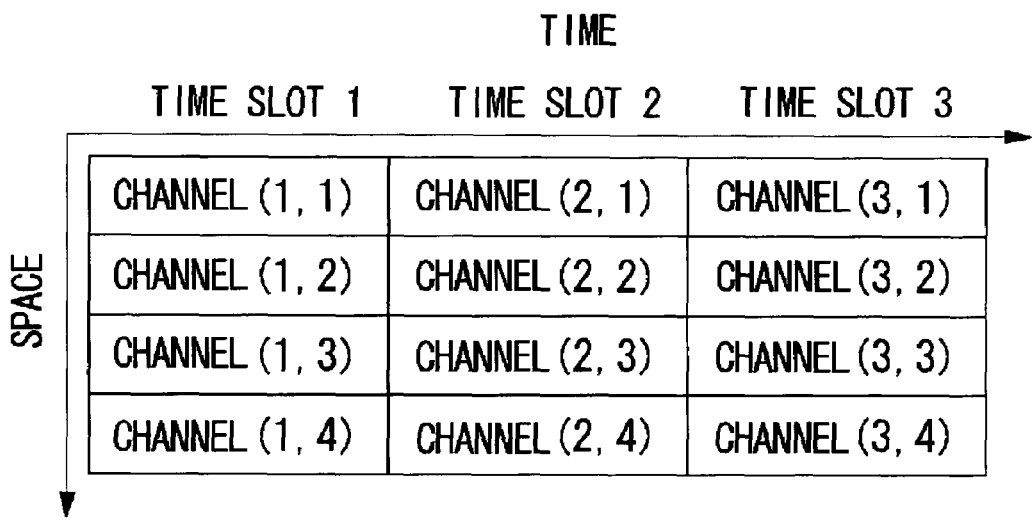
FIG. 3 shows an allocation of channels according to the first embodiment.

FIG. 3 shows an allocation of channels according to the first embodiment. In this allocation, there are four multiplex channels along the space axis of SDMA and three time slots, which are the number of multiplicity, along the time axis of TDMA. A total of 12 channels from channel (1, 1) to channel (3, 4) are arranged therein. It is to be noted that one terminal apparatus is allocated to one channel. And it is presumed here that information, such as the modulation method and error correction coding rate, on applicable terminal apparatuses is shared by the corresponding channels. FIG. 3 indicates either the up-link or the down-link. Moreover, this allocation may also be multiplexed in the frequency axis direction.

Figure 4:
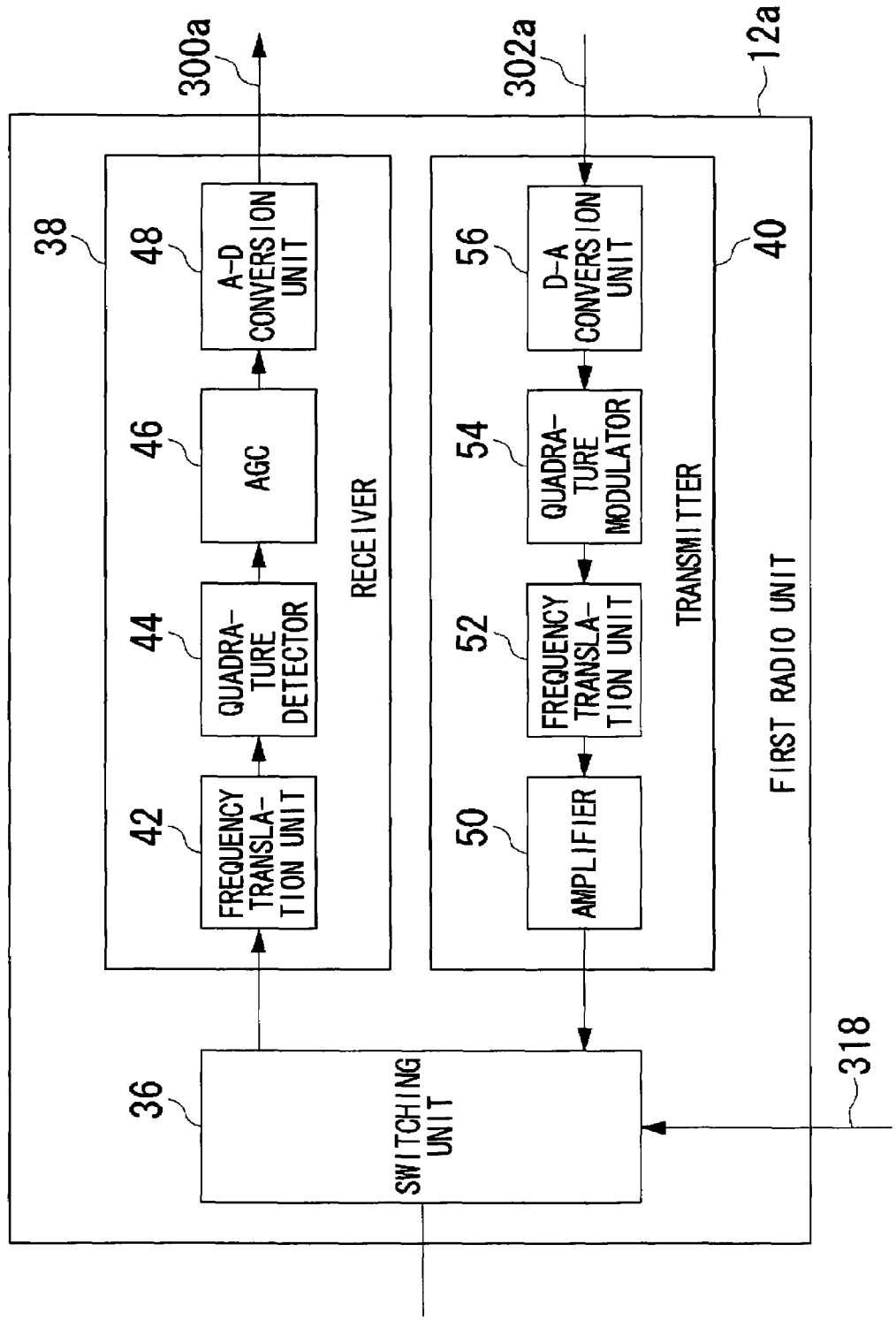
FIG. 4 shows a structure of a first radio unit shown in FIG. 1.
Figure 5:
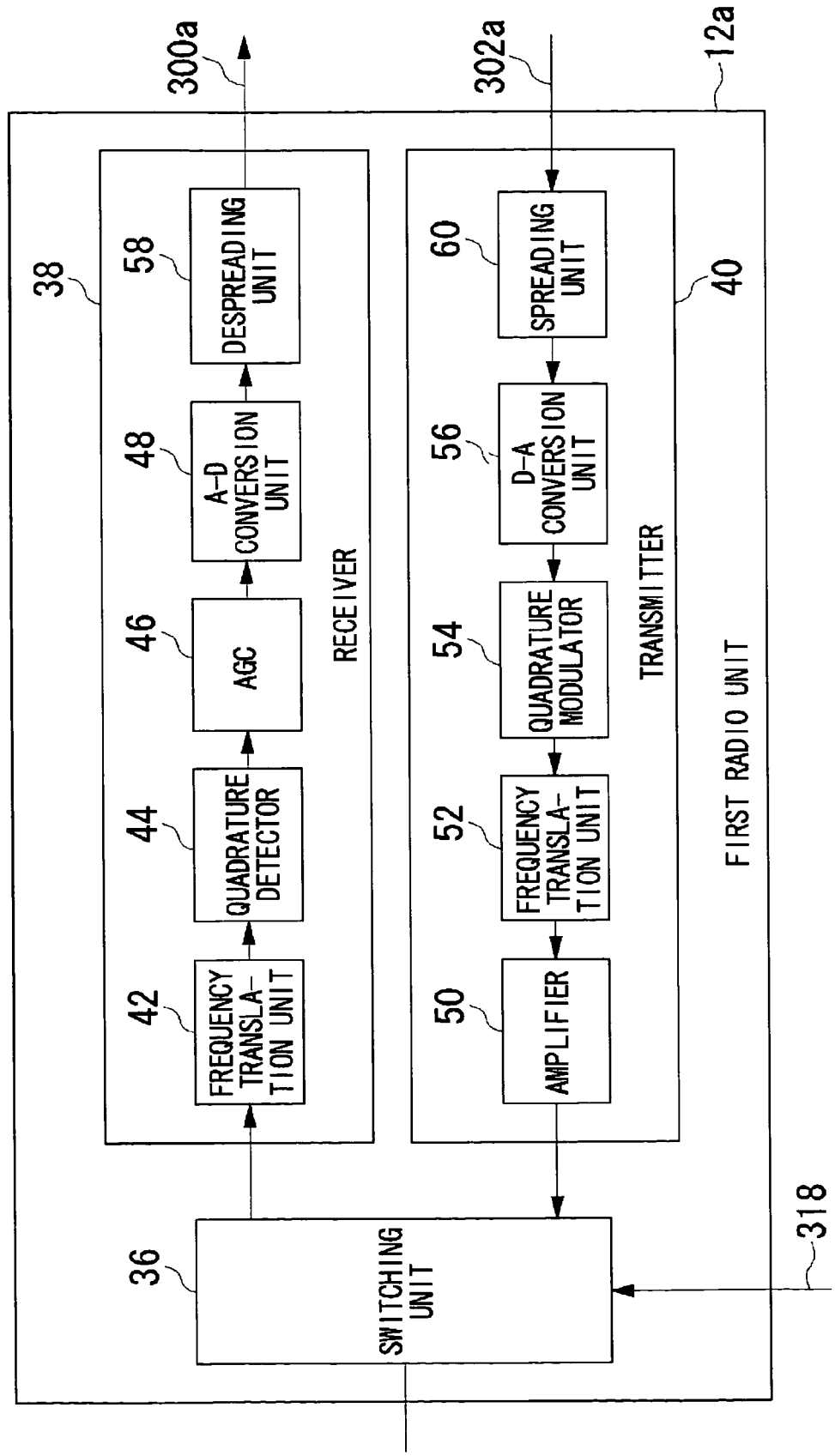
FIG. 5 shows another structure of the first radio unit shown in FIG. 1.
Figure 6:
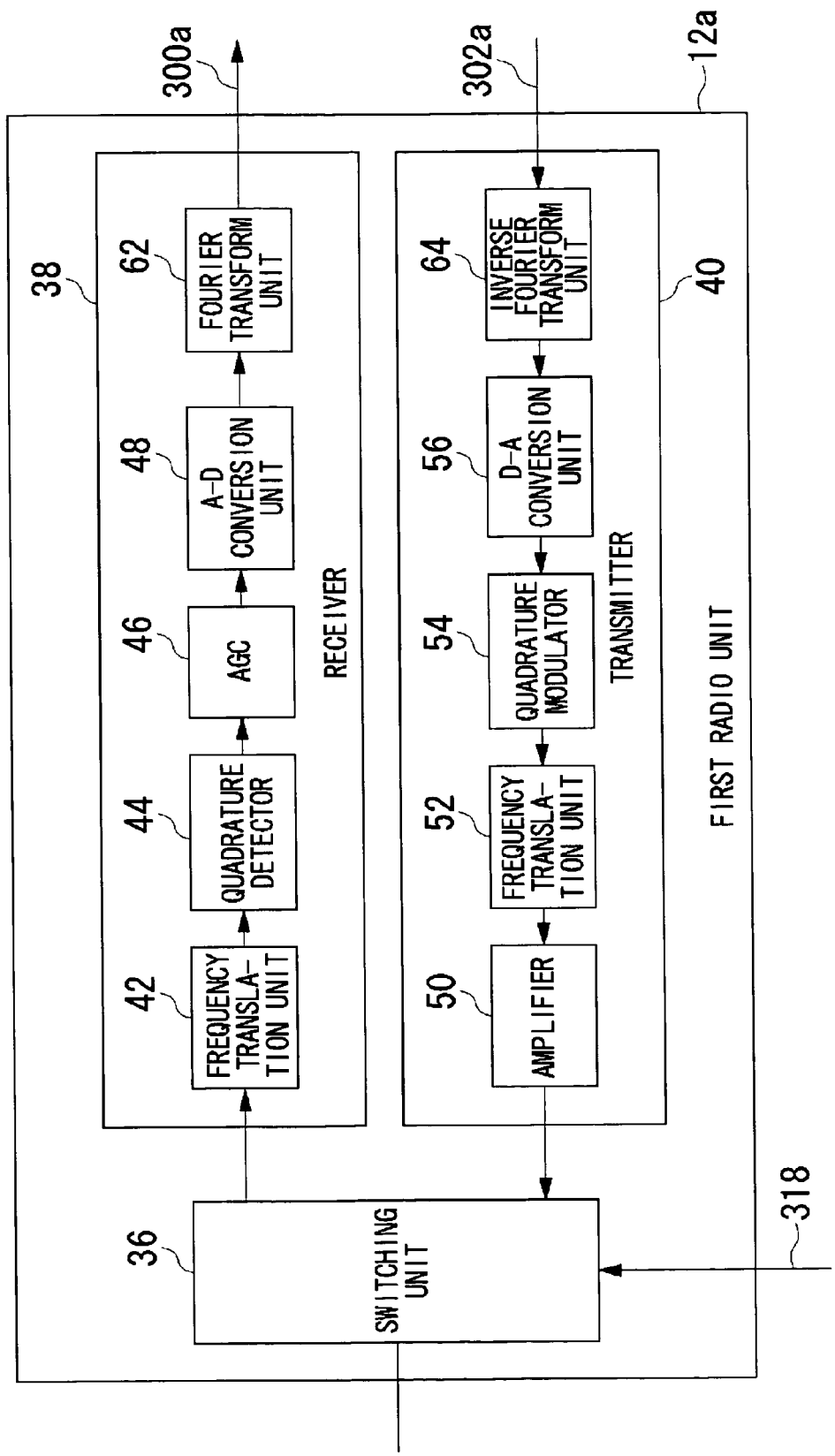
FIG. 6 shows still another structure of the first radio unit shown in FIG. 1

FIGS. 4 to 6 show different structures of a first radio unit 12a corresponding to different communication systems. Normally, differences between different communication systems are absorbed by the first radio unit 12a in the radio apparatus 10, so that the signal processing unit 14 positioned subsequent thereto can operate without being conscious of their differences. The first radio unit 12a as shown in FIG. 4, which may be compatible with single carrier communication systems such as a personal handyphone system as shown in FIG. 2 or other cellular phone systems, includes a switching unit 36, a receiver 38 and a transmitter 40. Furthermore, the receiver 38 includes a frequency translation unit 42, an quadrature detector 44, an AGC (automatic gain control) 46 and an A-D conversion unit 48, whereas the transmitter 40 includes an amplifier 50, a frequency translation unit 52, an quadrature modulator 54 and a D-A conversion unit 56.

Moreover, signals include a first digital received signal 300a, which is generically named a digital received signal 300, and a first digital transmission signal 302a, which is generically named a digital transmission signal 302. The first radio unit 12a as shown in FIG. 5, which may be compatible with spectrum-spreading communication systems, such as W-CDMA (Wideband-Code Division Multiple Access) or wireless LANs complying with IEEE802.11b, is added with a despreading unit 58 and a spreading unit 60. The first radio unit 12a as shown in FIG. 6, which may be compatible with multicarrier communication systems, such as wireless LANs complying with IEEE802.11a or HiperLAN/2, is added with a Fourier transform unit 62 and an inverse Fourier transform unit 64.

The switching unit 36 switches input and output of signals to the receiver 38 and the transmitter 40 according to the instructions from the control unit 20.

The frequency translation unit 42 in the receiver 38 and the frequency translation unit 52 in the transmitter 40 perform frequency translation between signals of radio frequencies and signals of one or more intermediate frequencies.

The quadrature detector 44 generates baseband analog signals from intermediate frequency signals through quadrature detection. On the other hand, the quadrature modulator 54 generates intermediate frequency signals from baseband analog signals through quadrature modulation.

The AGC 46 controls gain automatically to make the amplitude of baseband analog signals an amplitude within the dynamic range of the A-D conversion unit 48.

The A-D conversion unit 48 converts baseband analog signals into digital signals, and the D-A conversion unit 56 converts baseband digital signals into analog signals. Hereinbelow, the digital signals outputted from the A-D conversion unit 48 are called digital received signal 300, and the digital signals inputted to the D-A conversion unit 56 are called digital transmission signal 302.

The amplifier 50 amplifies radio frequency signals to be transmitted.

The spreading unit 60 and the despreading unit 58 both shown in FIG. 5 perform correlation processing of digital transmission signals 302 and digital received signals 300, respectively, by a predetermined spreading code sequence. The inverse Fourier transform unit 64 and the Fourier transform unit 62 both shown in FIG. 6 perform the inverse Fourier transform processing of digital transmission signals 302 and the Fourier transform processing of digital received signals 300, respectively.

Figure 7:
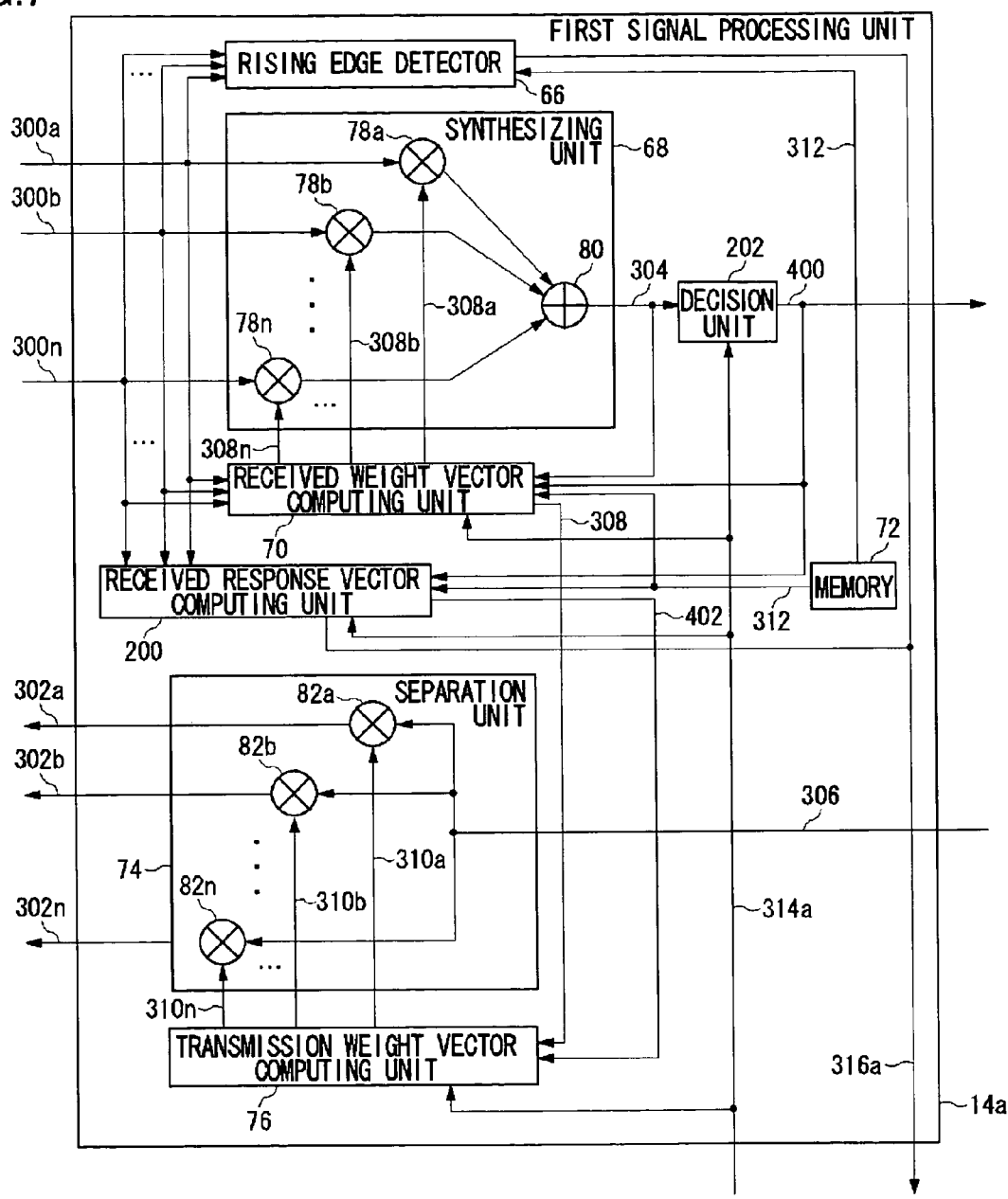
FIG. 7 shows a structure of a first signal processing unit shown in FIG. 1.

FIG. 7 shows a structure of a first signal processing unit 14a. The first signal processing unit 14a includes a rising edge detector 66, a memory unit 72, a received weight vector computing unit 70, a decision unit 202, a synthesizing unit 68, a received weight computing unit 200, a transmission weight vector computing unit 76 and a separation unit 74. Further, the synthesizing unit 68 includes a first multiplication unit 78a, a second multiplication unit 78b, ... and an N-th multiplication unit 78n, which are generically named a multiplication unit 78, and an addition unit 80, and the separating unit 74 includes a first multiplication unit 82a, a second multiplication unit 82b, ... and an N-th third multiplication unit 82n, which are generically named multiplication units 82.

Moreover, the signals used include a synthesized signal 304, a pre-separation signal 306, a first received weight vector 308a, a second received weight vector 308b, ... and an N-th received weight vector 308n, which are generically named received weight vectors 308, a first transmission weight vector 310a, a second transmission weight vector 310b, ... and an N-th transmission weight vector 310n, which are generically named transmission weight vectors 310, a training signal 312, a first input control signal 314a which is generically named an input control signal 314, a first output control signal 316a which is generically called an output control signal 316, a decision signal 400 and a received response vector 402.

The rising edge detector 66 detects from a digital received signal 300 the head of a burst signal that triggers the operation of a radio apparatus 10. The timing of the thus detected head of the burst signal is conveyed to the control unit 20 by the output control signal 316. Furthermore, the control unit 20 notifies each unit of various timing signals, generated from this timing, which are necessary for control.

The memory unit 72 stores the training signal 312 and outputs it as necessary.

The received weight vector computing unit 70 computes received weight vectors 308 necessary for weighting digital received signals 300 from the digital received signals 300, synthesized signal 304 and training signal 312 during a training, using an adaptive algorithm, such as RLS (Recursive Least Squares) algorithm or LMS (Least Mean Squares) algorithm. Similarly, the received weight vector computing unit 70 computes received weight vectors 308 for weighting digital received signals 300 from the digital received signals 300 and synthesized signal 304 after the completion of training, using the adaptive algorithm.

The synthesizing unit 68 weights the digital received signals 300 by the received weight vectors 308 at the multiplication units 78, then adds them up by the addition unit 80 and outputs a synthesized signal 304.

The decision unit 202 outputs a decision signal 400 by comparing beforehand a synthesis signal 304 with a prescribed threshold value. The decision may not necessarily be a hard decision but it may also be a soft decision.

The received response vector computing unit 200 computes the received response vectors 402 as the received response characteristic of received signals in relation to transmitted signals, from the digital received signals 300 and training signal 312 during the training period and from the digital received signals 300 and decision signal 400 after the completion of training.

The transmission weight vector computing unit 76 estimates transmission weight vectors 310 necessary for weighting pre-separation signals 306, from the received weight vectors 308 or the received response vectors 402 which are received response characteristics. The method for estimating the transmission weight vectors 310 is arbitrary, but as an easiest method, the received weight vectors 308 or received response vectors 402 may be used as they are. Alternatively, the received weight vectors 308 or received response vectors 402 may be corrected, using a conventional technique, with consideration given to the change in Doppler frequency in the propagation environment that may result from time difference between receiving processing and transmission processing. Though either the received weight vector 308 only or the received response vector 402 only may be used in estimating the transmission weight vector 310, it is assumed here that the received weight vector 308 is used as a normal setting whereas the received response vector 402 is used if the error contained in the received weight vector 308 is large.

The separation unit 74 weights the pre-separation signal 306 with the transmission weight vectors 310 at the multiplication units 82 and outputs a digital transmission signal 302.

Figure 8:
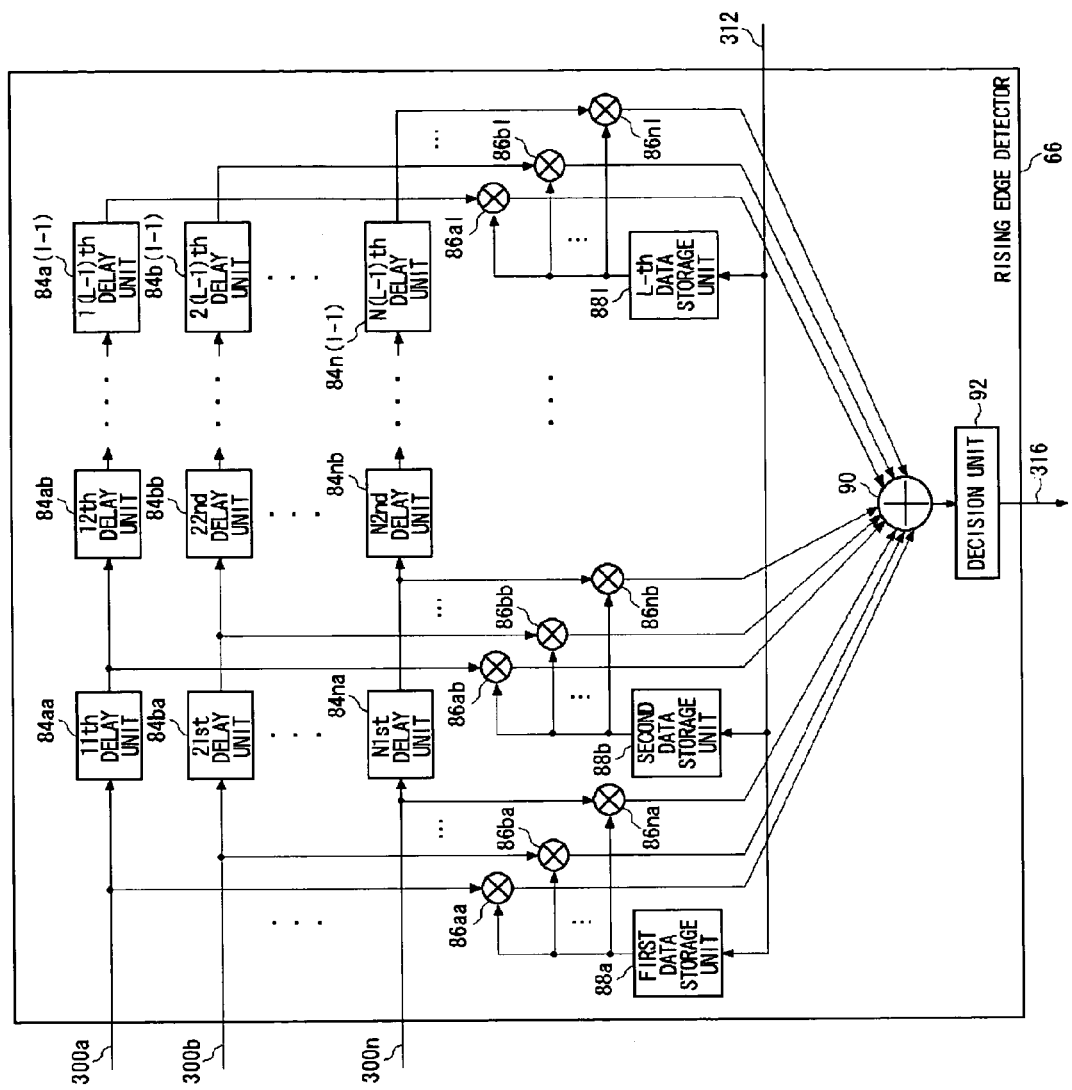
FIG. 8 shows a structure of a rising edge detector show in FIG. 8.
Figure 9:
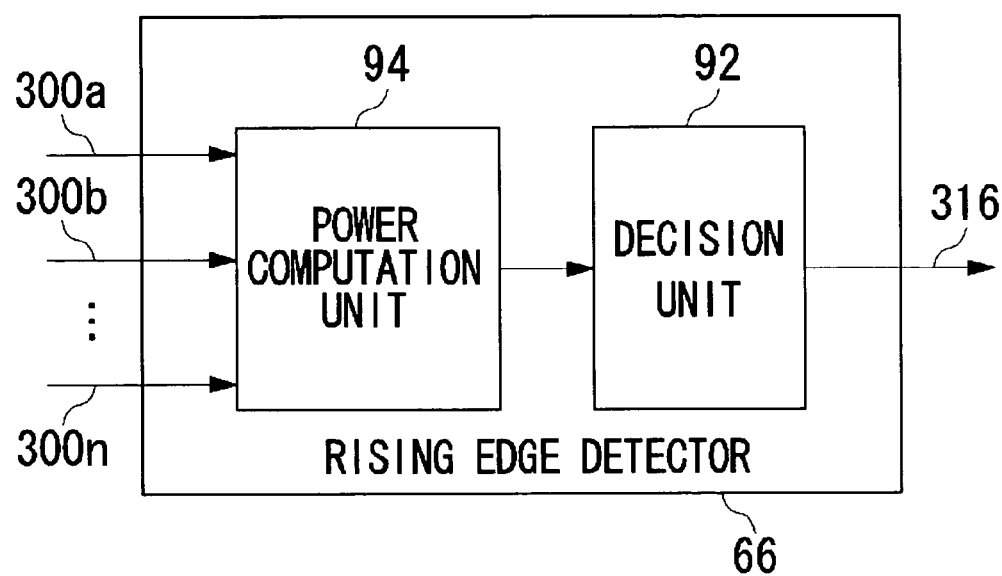
FIG. 9 shows another structure of the rising edge detector show in FIG. 8.

FIGS. 8 and 9 show structures of a rising edge detector 66, which are each based on a matched filter and received power measuring device. The rising edge detector 66 shown in FIG. 8 includes: an 11th delay unit 84aa, a 12th delay unit 84ab, ... and a 1(L-1)th delay unit 84a(l-1), a 21st delay unit 84*ba*, a 22nd delay unit 84*bb*, . . . and a 2(L−1)th delay unit 84*b*(l−1), . . . , and an N1st delay unit 84*na*, an N2nd delay unit 84*nb*, . . . and an N(L−1)th delay unit 84*n*(l−1), which are generically named delay units 84; an 11th multiplication unit 86*aa*, a 12th multiplication unit 86*ab*, . . . and a 1L-th multiplication unit 86*al*, a 21st multiplication unit 86*ba*, a 22nd multiplication unit 86*bb*, . . . and a 2L-th multiplication unit 86*bl*, . . . , and an N1st multiplication unit 86*na*, an N2nd multiplication unit 86*nb*, . . . and an NL-th multiplication unit 86*nl*, which are generically named multiplication units 86; a first data storage unit 88*a*, a second data storage unit 88*b*, . . . and an L-th data storage unit 88*l*, which are generically named data storage units 88; an addition unit 90; and a decision unit 92.

The delay units 84 delay the inputted digital received signals 300 in parallel for respective antennas 22 for a correlation processing.

The data storage unit 88 stores the training signal 312 for detecting the head of a burst signal or a part thereof by one symbol each.

The multiplication units 86 multiply the delayed digital received signals 300 by the training signal 312, and the addition unit 90 further adds up the products.

Based on the result of the addition by the addition unit 90, the decision unit 92 detects the timing when the value reaches a maximum as the timing of the head of the burst signal and outputs it via an output control signal 316.

On the other hand, the rising edge detector 66 shown in FIG. 9 includes a power computation unit 94 and a decision unit 92. The power computation unit 94 computes received power of digital received signals 300 for a predetermined period and derives the electric power of signals-received by all the antennas 22 by totaling it.

The decision unit 92 compares the thus obtained electric power of received signals with a predetermined condition, and, when it meets the condition, judges that the head of a burst signal has been detected. The condition may be that a period in which the received power is larger than a value of electric power set as a threshold value exceeds a predetermined period.

Figure 10:
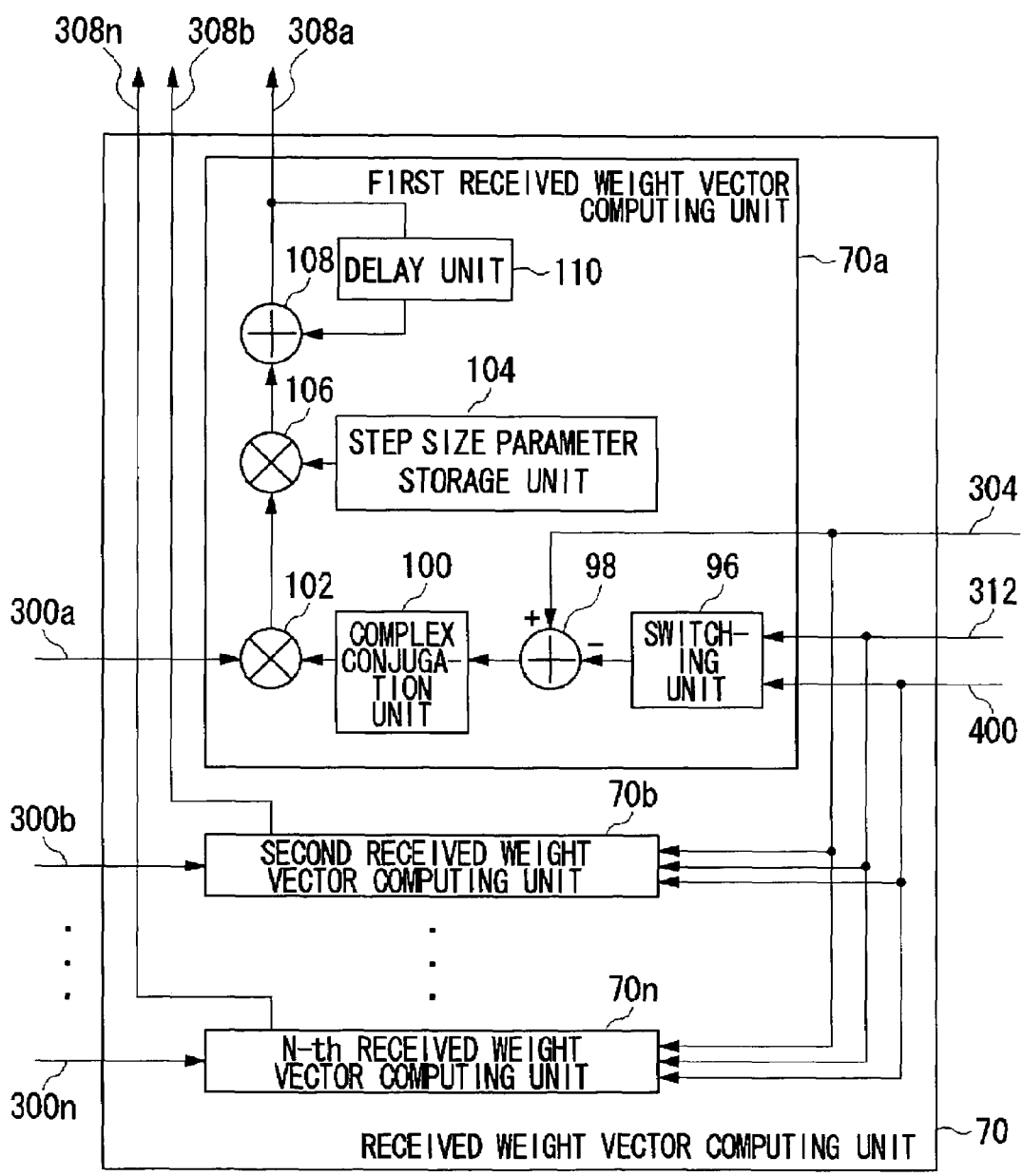
FIG. 10 shows a structure of a received weight vector computing unit shown in FIG. 7.

FIG. 10 shows a structure of a received weight vector computing unit 70 which executes the LMS algorithm. The received weight vector computing unit 70 includes a first received weight vector computing unit 70*a*, a second received weight vector computing unit 70*b*, . . . and an N-th received weight vector computing unit 70*n*. Further, the first received weight vector computing unit 70*a* includes a switching unit 96, an addition unit 98, a complex conjugation unit 100, a multiplication unit 102, a step size parameter storage unit 104, a multiplication unit 106, an addition unit 108 and a delay unit 110.

As a reference signal for the LMS algorithm, the switching unit 96 selects a training signal 312 during a training period and selects a decision signal 400 after the training.

The addition unit 98 computes the difference between the synthesis signal 304 and the reference signal, and outputs an error signal. The error signal is subjected to a complex conjugation conversion by the complex conjugation unit 100.

The multiplication unit 102 multiplies the error signal after the complex conjugation conversion by the first digital received signal 300*a*, and generates a first result of the multiplication.

The multiplication unit 106 multiplies the first result of multiplication by a step size parameter stored in the step size parameter storage unit 104, and generates a second result of multiplication. The second result of multiplication is fed back by the delay unit 110 and the addition unit 108, and then added to a new second result of multiplication. In this manner, the result of addition updated successively by the LMS algorithm is outputted as a first received weight vector 308*a*.

FIG. 11 shows a structure of a received response vector computing unit 200 which carries out correlation processing. The received response vector computing unit 200 includes a switching unit 204, a first correlation computing unit 206, a second correlation computing unit 208, an inverse matrix computing unit 210 and a final computing unit 212.

The switching unit 204 selects as a reference signal a training signal 312 during a training, and selects a decision signal 400 after the training. It is to be noted that the training signal 312 and the decision signal 400 may be inputted not only from within the first signal processing unit 14*a* but also from the second signal processing unit 14*b* or the M-th signal processing unit 14*m* corresponding to other user terminal apparatuses 26 via a signal line, which is not shown here. For the sake of brevity, if the number of users of terminal apparatuses 26 is 2, then the reference signal corresponding to the first terminal apparatus 16 is designated as $S_1(t)$, and the reference signal corresponding to the second terminal apparatus 26 is designated as $S_2(t)$.

The first correlation computing unit 206 computes a first correlation matrix between digital received signals 300 and reference signals. For the sake of simplicity, if the number of antennas 22 is 2, $x_1(t)$ of a first digital received signal 300*a* and $x_2(t)$ of a second digital received signal 300*b* are defined by Equation (1):

$$x_1(t) = h_{11}S_1(t) + h_{21}S_2(t)$$

$$x_2(t) = h_{12}S_1(t) + h_{22}S_2(t) \qquad (1)$$

where $h_{ij}$ is the response characteristic from an ith terminal apparatus 26 to a jth antenna 22*j*, with noise ignored. A first correlation matrix $R_1$, with E as an ensemble average, can be expressed by Equation (2):

$$R_1 = \begin{bmatrix} E[x_1 S_1^*] & E[x_2 S_1^*] \\ E[x_1 S_2^*] & E[x_2 S_2^*] \end{bmatrix} \qquad (2)$$

The second correlation computing unit 208 computes a second correlation matrix $R_2$ between reference signals, which is given by Equation (3):

$$R_2 = \begin{bmatrix} E[S_1 S_1^*] & E[S_1^* S_2] \\ E[S_2 S_1^*] & E[S_2^* S_2] \end{bmatrix} \qquad (3)$$

The inverse matrix computing unit 210 computes an inverse matrix of the second correlation matrix R2.

The final computing unit 212 multiplies the inverse matrix of the second correlation matrix $R_2$ and the first correlation matrix $R_1$ together and outputs the received response vector 402, which is expressed by Equation (4):

$$\begin{bmatrix} h_{11} & h_{12} \\ h_{21} & h_{22} \end{bmatrix} = R_1 R_2^{-1} \qquad (4)$$

FIG. 12 shows a structure of a control unit 20. The control unit 20 includes a memory unit 218, a channel allocating unit 216, a channel management unit 220 and a correlation computing unit 214.

The memory unit 218 stores the relationship between user transmission rates and access permission numbers. Here, a personal handyphone system is assumed, and the factor defining the user transmission rate is assumed to be the modulation technique only and error correction is not taken into consideration. The actual access permission numbers in relation to the modulation techniques are one for 64 QAM, two for 16 QAM and four for QPSK. When a plurality of terminal apparatuses 26 are connected to the same time slot by SDMA, the modulation technique which determines the access permission number is assumed to be the modulation method that corresponds to the highest user transmission rate used among the plurality of terminal apparatuses 26. The channel allocating unit 216 allocates channels allocated to the respective terminal apparatuses 26 along the time axis and the space axis in such a manner as to satisfy the relationship stored in the memory unit 218. The channel allocating unit 216 also performs the timing control The channel management unit 220 stores the allocation of channels to which terminal apparatuses 26 are already allocated.

The correlation computing unit 214 inputs an output control signal 316, computes a correlation value of received response vector 402 between different channels and notifies the channel allocating unit 216 of the result. This correlation value, based on the received response characteristic, generally represents the correlation of space.

Figure 13:
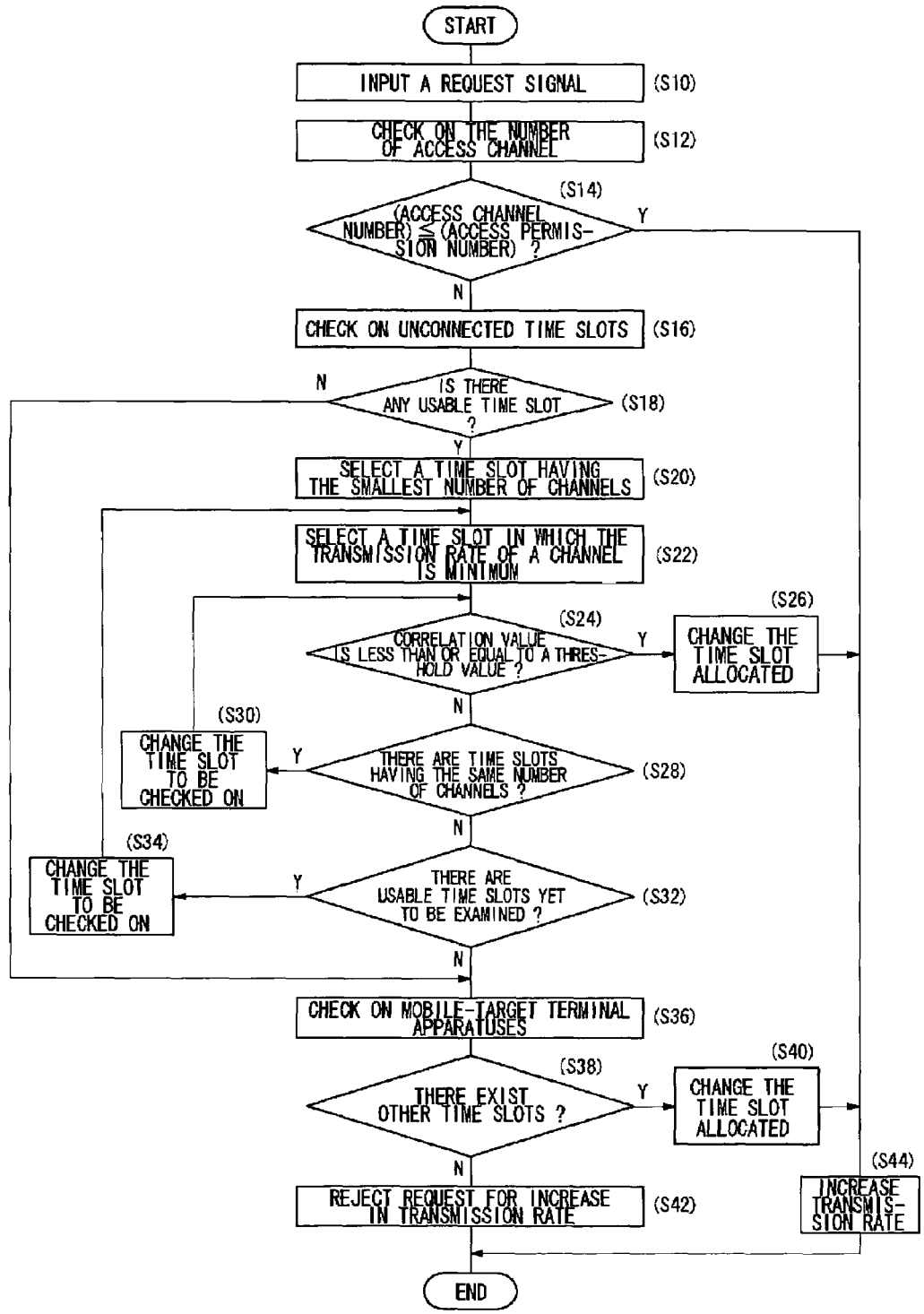
FIG. 13 is a flowchart showing a procedure for allocating channels according to the first embodiment.

FIG. 13 shows a procedure for changing the data transmission rate in response to a request from an increase requesting terminal apparatus. The channel allocating unit 216 shown in FIG. 12 inputs a request signal for an increase in the data transmission rate by changing the modulation method used by an increase requesting terminal apparatus (S10). Hereinafter, the modulation method thus requested is referred to as "requested modulation method". Where the increase in the transmission rate is in the down-link, the request signal is inputted as a baseband unit control signal 322 from a network 24 via a baseband unit 18. And where it is in the up-link, the request signal is inputted as a modem unit control signal 320 via a modem unit 18. The channel allocating unit 216 checks on the number of all the channels (hereinafter referred to as "access channel number") in the time slot containing the channel allocated to the increase requesting terminal apparatus (hereinafter referred to as "connection time slot") by referring to the channel management unit 220 (S12).

The channel allocating unit 216 compares the access permission number and the access channel number in the connection time slot when the increase requesting terminal apparatus has been set for the requested modulation method, and, if the access channel number is less than or equal to the access permission number (Y of S14), increases the transmission rate by changing the access requesting terminal apparatus for the requested modulation method (S44). On the other hand, if the access channel number is not less than or equal to the access permission number (N of S14), the channel allocating unit 216 checks on both the number of channels contained in all the time slots other than the connection time slot and the modulation methods by referring to the channel management unit 220 (S16). Hereinafter, one or all of the applicable time slots are referred to as "unconnected time slots".

Where there is any unconnected time slot by which a channel can be allocated to the increase requesting terminal apparatus changed for the requested modulation method (hereinafter referred to as "usable time slot") (Y of S18), the channel allocating unit 216 selects one of the usable time slots which has the smallest number of channels (S20). Further, if there are a plurality of usable time slots thus selected, the channel allocating unit 216 selects a time slot in which the transmission rate of a channel is the minimum (hereinafter referred to as "target time slot")(S22).

The correlation computing unit 214 computes correlation values of the received response vectors 402 corresponding to the channels contained in the target time slot and the received response vector 402 of the increase requesting terminal apparatus. And if the correlation value is less than or equal to a threshold value (Y of S24), the channel allocated to the increase requesting terminal apparatus is changed to the channel contained in the target time slot (S26). Where the correlation value is not less than or equal to the threshold value (N of S24), where there is a time slot that has the same number of channels as the target time slot (Y of S28) or where there are usable time slots yet to be examined (Y of S32), the time slot to be checked on (S30, S34) is changed so as to repeat the above processing. On the other hand, if there is no usable time slot yet to be examined (N of S32), the procedure goes on to the next step.

In unconnected time slots, a check is performed to see whether or not, even when a new channel is allocated to the terminal apparatuses other than the increase requesting terminal apparatus in the connected time slot (hereinafter, one or all of the applicable terminal apparatuses will be referred to as "mobile-target terminal apparatus"), the number of channels does not exceed the access permission number and furthermore the value correlation value of the received response vectors 402 corresponding to the existing channels contained in the unconnected time slots and the received response vectors 402 of the mobile-target terminal apparatus is less than or equal to the threshold value (S36). If there are unconnected time slots that satisfy the above conditions (Y of S38), then the channel to be allocated to the mobile-target terminal apparatus is changed to a channel contained in the applicable unconnected time slots (S40). On the other hand, if there is not any (N of S38), the request for an increase in data transmission rate from the increase requesting terminal apparatus is rejected (S42).

Figure 14B:
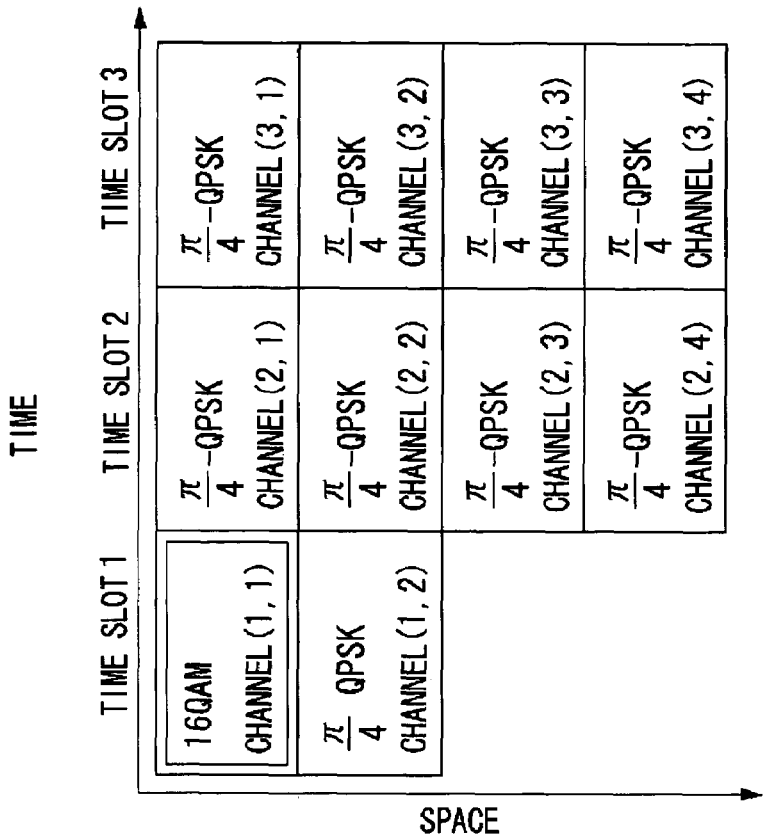
FIGS. 14A and 14B show allotments of channels according to the procedure shown in FIG. 13.
Figure 14A:
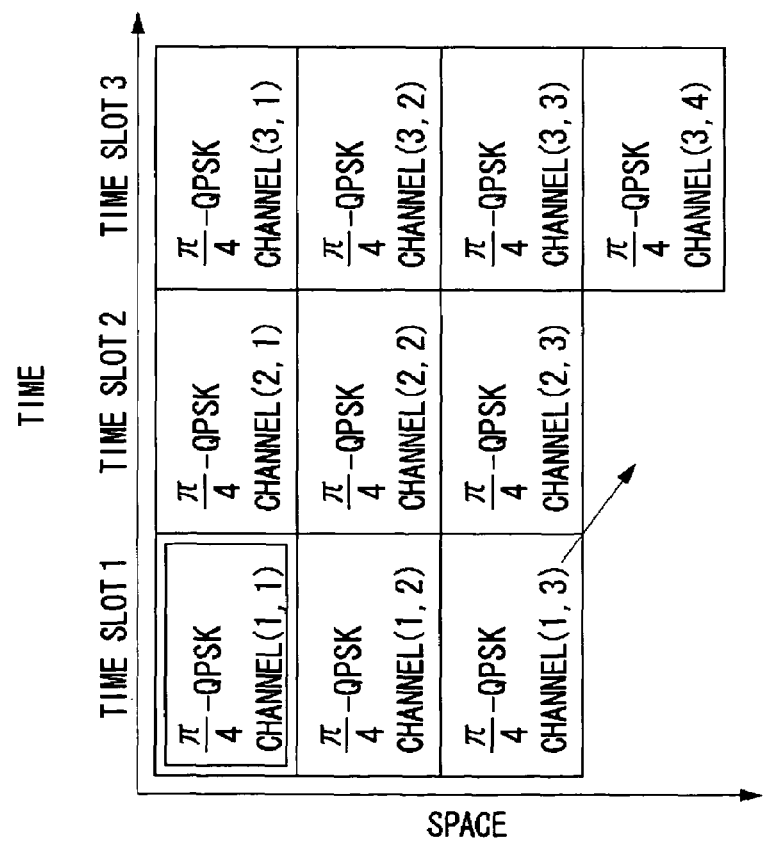

An operation for the radio apparatus 10 structured as above will be described hereinbelow based on the channel allocation scheme, shown in FIGS. 14A and 14B, using the procedures of FIG. 13 the procedures. FIG. 14A shows an allotment of channels in an initial state, where QPSK is the modulation technique for all the channels. In this allocation, if the increase requesting terminal apparatus allocated to the channel (1, 1) in time slot 1 requests 16 QAM as the requested modulation method, the access permission number of time slot 1 will be 2, which is larger than 3 of the existing number of channels, and therefore it is impossible to change to the requested modulation method in the present channel allotment as shown in FIG. 14A. Since the numbers of channels in time slot 2 and time slot 3 are 3 and 4, respectively, it is also impossible to change to the requested modulation method by shifting the increase requesting terminal apparatus to time slot 2 or time slot 3. On the other hand, since the mobile-target terminal apparatus allocated to the channel (1, 3) in FIG. 14A can be shifted to time slot 2, this mobile-target terminal apparatus is allocated to the channel (2, 4) as shown in FIG. 14b before the increase requesting terminal apparatus allocated to the channel (1, 1) is changed to 16 QAM which is the requested modulation method.

According to the first embodiment, the access permission number of a time slot which connects terminal apparatuses with high data transmission rates is made small, whereas that of a time slot which connects terminal apparatuses with low data transmission rates is made large, so that the degree of multiplexing for a time slot which connects terminal apparatuses with low data transmission rates can be raised higher while suppressing the degradation of data transmission quality of terminal apparatuses with high data transmission rates.

Second Embodiment

According to a second embodiment, similarly to the first embodiment, the radio apparatus changes the connection of a terminal apparatus in a predetermined time slot to the connection in another time slot according to the access permission number. In the first embodiment, the radio apparatus changes the time slots for connection of a terminal apparatus in such a way as to satisfy a request for an increase in data transmission rate from a single terminal apparatus in connection by SDMA. In contrast thereto, in the second embodiment, even without a request for an increase in data transmission rate, the time slots for connection of terminal apparatuses are changed so that there may be different numbers of terminal apparatuses connected by SDMA in a plurality of time slots.

For example, where all the time slots of a radio apparatus are being used for the connection to the terminal apparatuses, a terminal apparatus that newly requests access (hereinafter referred to as "new terminal apparatus") is multiplexed with one of the already connected terminal apparatuses, with the result that the data transmission rate of the new terminal apparatus is restricted to a value defined by the access permission number. Hence, the radio apparatus according to the present embodiment prepares a time slot for connection by a new terminal apparatus by changing beforehand the time slot in connection with a predetermined terminal apparatus in order to raise the probability of connection when a new terminal apparatus requests connection at a higher data transmission rate.

Since the structure as shown in FIG. 1 is valid as a structure of the radio apparatus 10 according to the second embodiment, the description thereof is omitted.

Figure 15:
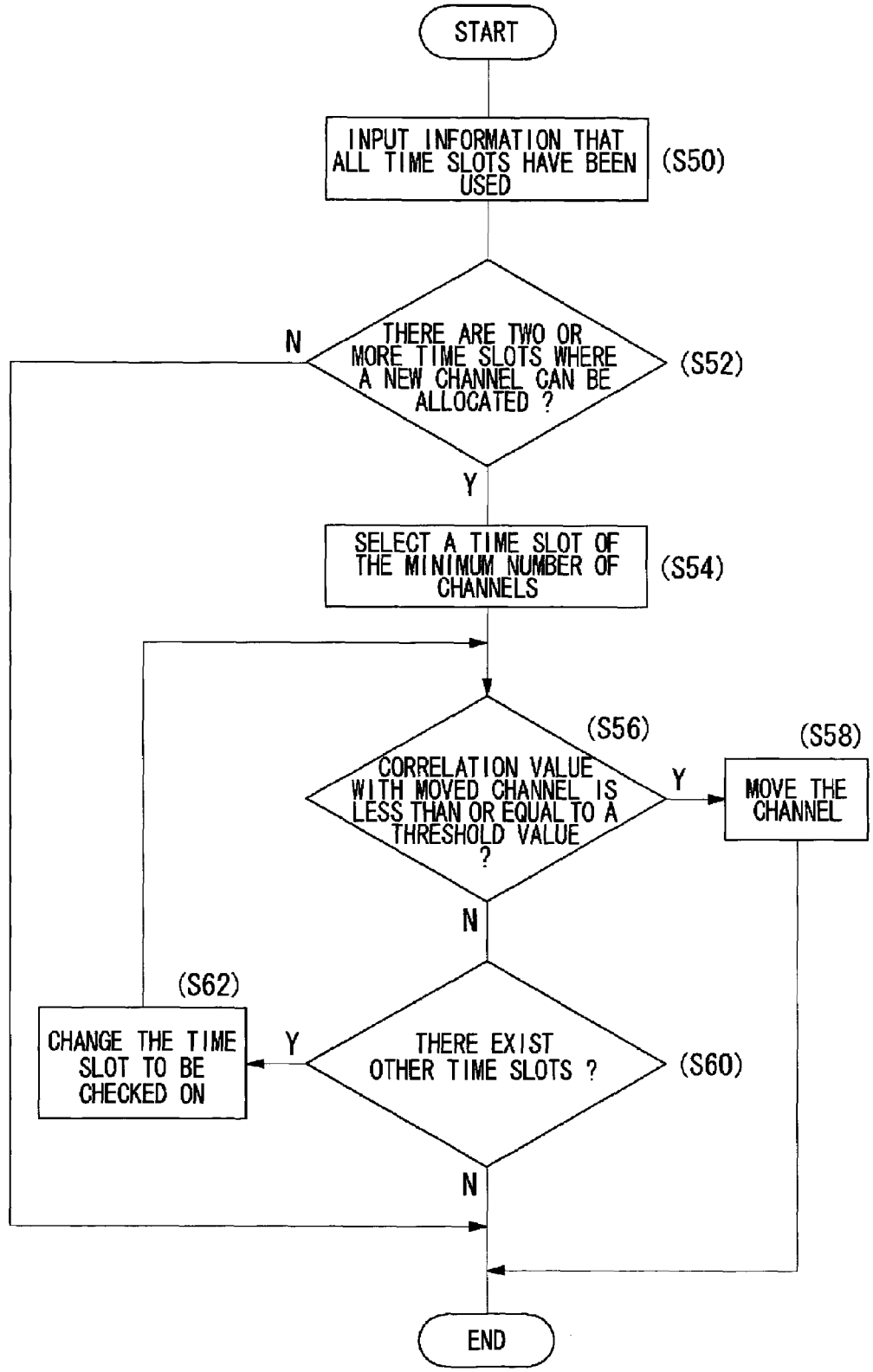
FIG. 15 is a flowchart showing a procedure for allocating channels according to a second embodiment of the present invention.

FIG. 15 shows a procedure for changing a channel allotment. The channel allocating unit 216 shown in FIG. 12 inputs information that channels have been allocated in all the time slots from the channel management unit 220 (S50). The channel allocating unit 216 checks by referring to the channel management unit 220 to see whether there are two or more time slots, from among all the time slots, where a new channel can be allocated (hereinafter referred to as "usable time slot"), that is, whether there are two or more time slots where the number of channels to which a terminal apparatus 26 is allocated is smaller than the access permission number. If there are not any (N of S52), the procedure is terminated, but if there are (Y of S52), the usable time slot where the number of channels is the smallest is selected (S54). Hereinbelow, the usable time slot thus selected is referred to also as "target time slot," and the one not selected is referred to as "untargeted time slot".

The correlation values of the received response vectors 402 corresponding to the channels contained in the target time slot and the received response vectors 402 corresponding to the channels contained in the untargeted time slots are computed. And if the correlation value is less than or equal to a threshold value (Y of S56), a channel in the untargeted time slot is allocated to the terminal apparatus 26 allocated to the channel contained in the target time slot (S58). If the correlation value is not less than or equal to the threshold value (N of S56) and there is any untargeted time slot which is not the target time slot (Y of S60), the target time slot is changed (S62) and the above processing is repeated. On the other hand, if there is no untargeted time slot which is not the target time slot (N of S60), the processing is terminated.

Figure 16A:
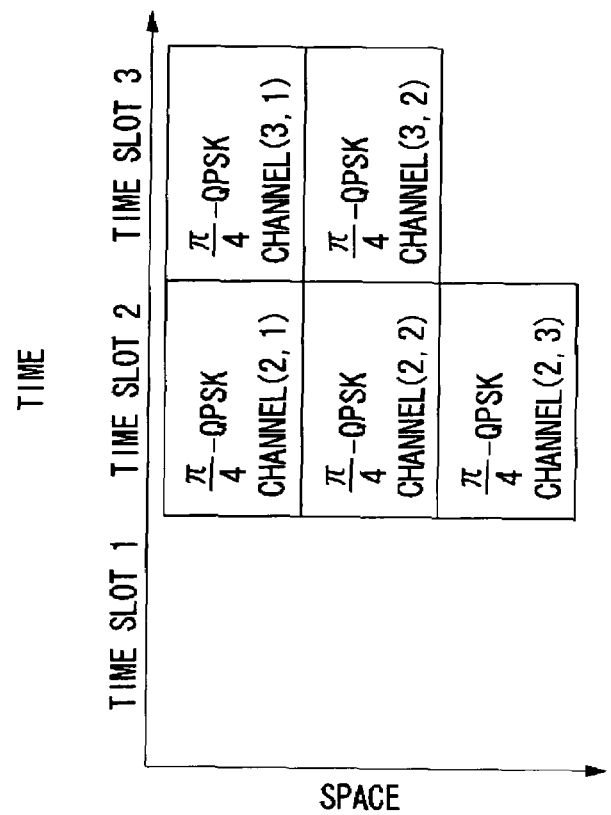
FIGS. 16A and 16B show allotments of channels according to the procedure shown in FIG. 15.
Figure 16B:
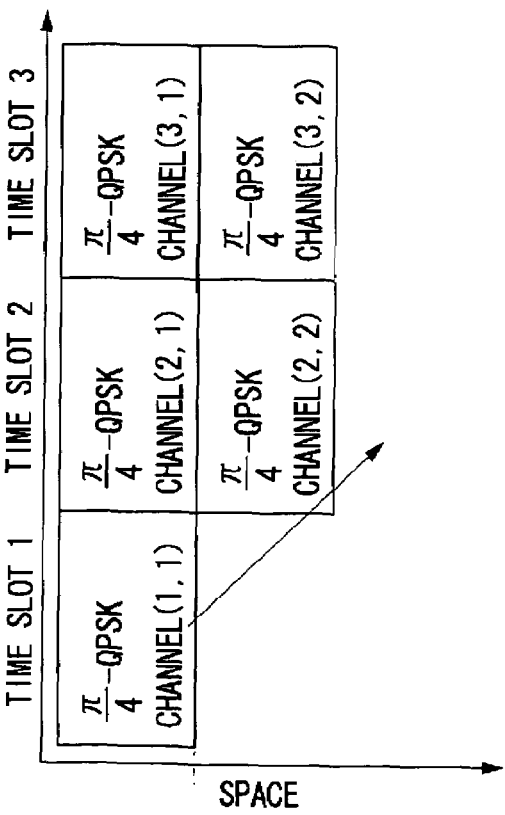

An operation for the radio apparatus 10 structured as above will be described hereinbelow based on the channel allocation scheme, shown in FIGS. 16A and 16B, using the procedures of FIG. 15. FIG. 16A shows an allotment of channels in an initial state, where channels whose modulation method is QPSK are allocated in the time slots. Since the number of channels in any of the time slots is smaller than 4 of the access permission number, time slot 1, which has the smallest number of channels, is selected as the target time slot. Since the terminal apparatus 26 allocated to the channel (1, 1) contained in the target time slot can be shifted to time slot 2, this allocation is changed to the-channel (2, 3) as shown in FIG. 16B to zero the number of channels allocated in time slot 1.

According to the second embodiment, time slots with fewer channels are prepared by controlling the numbers of channels allocated in time slots in such a manner that they vary among the time slots, so that connection at a higher data transmission rate is made possible for a terminal apparatus newly requesting access.

Third Embodiment

According to a third embodiment, similarly to the first and second embodiments, the radio apparatus accesses a plurality of terminal apparatuses by SDMA. However, in the third embodiment, different from the first and second embodiments, when the respective radio signals for a plurality of terminal apparatuses cannot be separated adequately even by an adaptive array antenna provided on a radio apparatus, the plurality of terminal apparatuses are multiplexed without using the SDMA. Instead, multiplexing is done by using one time slot in turn, for example, after increasing the data transmission rate (hereinafter referred to as "packet transmission"). By this multiplexing, it is possible to reduce the degradation of data transmission quality due to interference.

Since the structure as shown in FIG. 1 is valid as a structure of the radio apparatus 10 according to the third embodiment, the description thereof is omitted.

Figure 17:
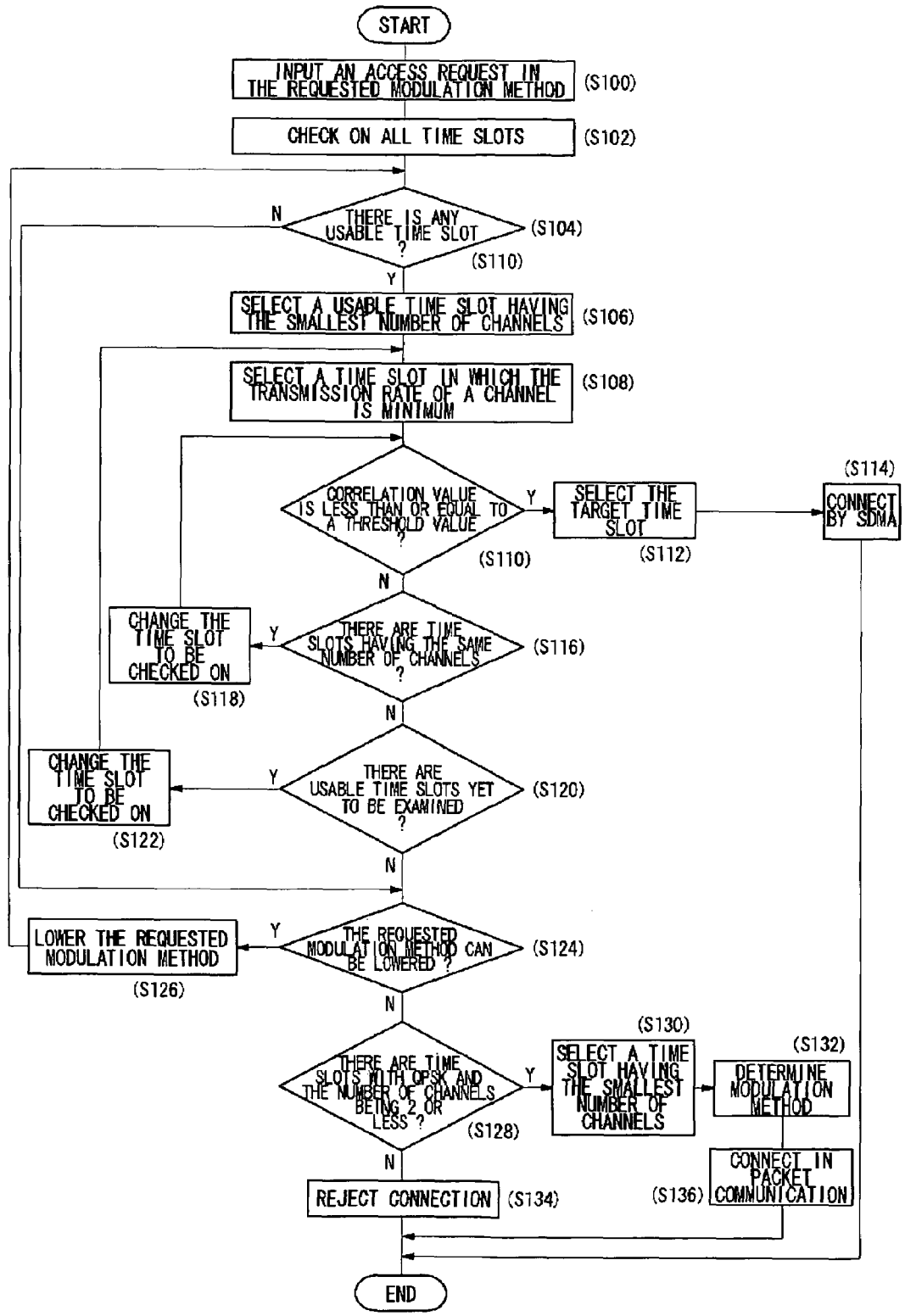
FIG. 17 is a flowchart showing a procedure for allocating channels according to a third embodiment of the present invention.

FIG. 17 shows a procedure for connecting a new terminal apparatus with a radio apparatus. The channel allocating unit 216 shown in FIG. 12 inputs a request for connecting in a predefined modulation method from a new terminal apparatus (hereinafter, the modulation method thus requested is referred to as "requested modulation method") by a modem unit control signal 320 via a modem unit 18 (S100). The channel allocating unit 216 checks on the numbers of channels and the modulation methods contained in all the time slots, respectively, by referring to the channel management unit 220 (S102). If there is no time slot to which a channel of the requested modulation method can be newly allocated, that is, when channels equivalent to the access permission number are allocated in all the time slots (N of S104), the procedure goes on to step 124 and thereafter. On the other hand, if there is any time slot (hereinafter referred to as "usable time slot") (Y of S104), the channel allocating unit 216 selects one of the usable time slots which has the smallest number of channels (S106). Further, if there are a plurality of usable time slots thus selected, the channel allocating unit 216 selects a time slot where the channel transmission rate is the smallest (hereinafter referred to as "target time slot")(S108).

The correlation computing.unit 214 computes correlation values of the received response vectors 402 corresponding to the channels contained in the target time slot and the received response vector 402 of the new terminal apparatus and, if the correlation value is less than or equal to a threshold value (Y of S110), selects the target time slot (S112) and connects the new terminal apparatus by SDMA within the selected slot (S114). If the correlation value is not less than or equal to the threshold value (N of S110) and there is a time slot that has the same number of channels as the target time slot (Y of S116) or where there are usable time slots yet to be checked on (Y of S120), the time slot to be checked on is changed (S118, S122) and the above processing is repeated. On the other hand, if there is no usable time slot yet to be checked on (N of S120) and the requested modulation method from the new terminal apparatus can be lowered, for example, from 16 QAM to QPSK (Y of S124), the above processing is repeated after lowering the modulation method to the requested modulation method (S126).

The channel allocating unit 216 further checks all the time slots to find time slots in which the modulation method is QPSK and the number of existing channels is 2 or less by referring to the channel management unit 220. And if there any such a time slot (Y of S128), the channel allocating unit 216 selects the time slot which has the smallest number of channels in the applicable time slot (hereinafter referred to as "shared time slot") (S130). Even when one channel in the shared time slot is used in turn by the already allocated terminal apparatus 26 (hereinafter referred to as "existing terminal apparatus") and the new terminal apparatus, the modulation method for the existing terminal apparatus and the new terminal apparatus is determined in such a way as to retain the data transmission rate of the existing terminal apparatus (S132) and the new terminal apparatus is connected in packet communication (S136). On the other hand, if there is no time slot in which the modulation method is QPSK and the number of existing channels is 2 or less (N of S128), the connection of the new terminal apparatus is rejected (S134).

An operation for the radio apparatus 10 structured as above will be described hereinbelow based on the channel allocation scheme, shown in FIGS. 18A and 18B, using the procedures of FIG. 17. FIG. 18A shows an allotment of channels in an initial state, where channels whose modulation method is QPSK are allocated in the time slots. Further, the requested modulation method for the new terminal apparatus requesting access is assumed to be QPSK also. The number of channels in any of the time slots is smaller than 4 of the access permission number, but the correlation values of the received response vectors 402 corresponding to channel (1, 1) to channel (3, 2) and the received response vector 402 of the new terminal apparatus are larger than the threshold value, so that the new terminal apparatus cannot be connected by SDMA to any of the time slots. Then time slot 1 which has the smallest number of channels is selected as the shared time slot. As a result, as shown in FIG. 18b, channel (1, 1) is allocated alternately to the existing terminal apparatus in time slot 1 and to the new terminal apparatus in time slot 1', which is the timing existing periodically after time slot 1.

According to the third embodiment, if a plurality of terminal apparatuses are multiplexed in the same time slot, the degradation in data transmission quality can be suppressed by using SDMA, which features a high data transmission efficiency, when the partition of space is adequate. And it can be suppressed by using the packet communication with less interference, when the partition of space is not adequate.

Fourth Embodiment

A fourth embodiment, similarly to the first embodiment, involves a case where one of terminal apparatuses connected to the radio apparatus by SDMA requests an increase in data transmission rate. In the first embodiment, the time slot to which the terminal apparatus is connected is changed according to the connection permission number. In addition thereto, similarly to the third embodiment, a single time slot is used in turn by a plurality of terminal apparatuses when a plurality of radio signals to be used in SDMA cannot be separated adequately even by an adaptive array antenna.

Since the structure as shown in FIG. 1 is valid as a structure of the radio apparatus 10 according to the fourth embodiment, the description thereof is omitted.

Figure 19:
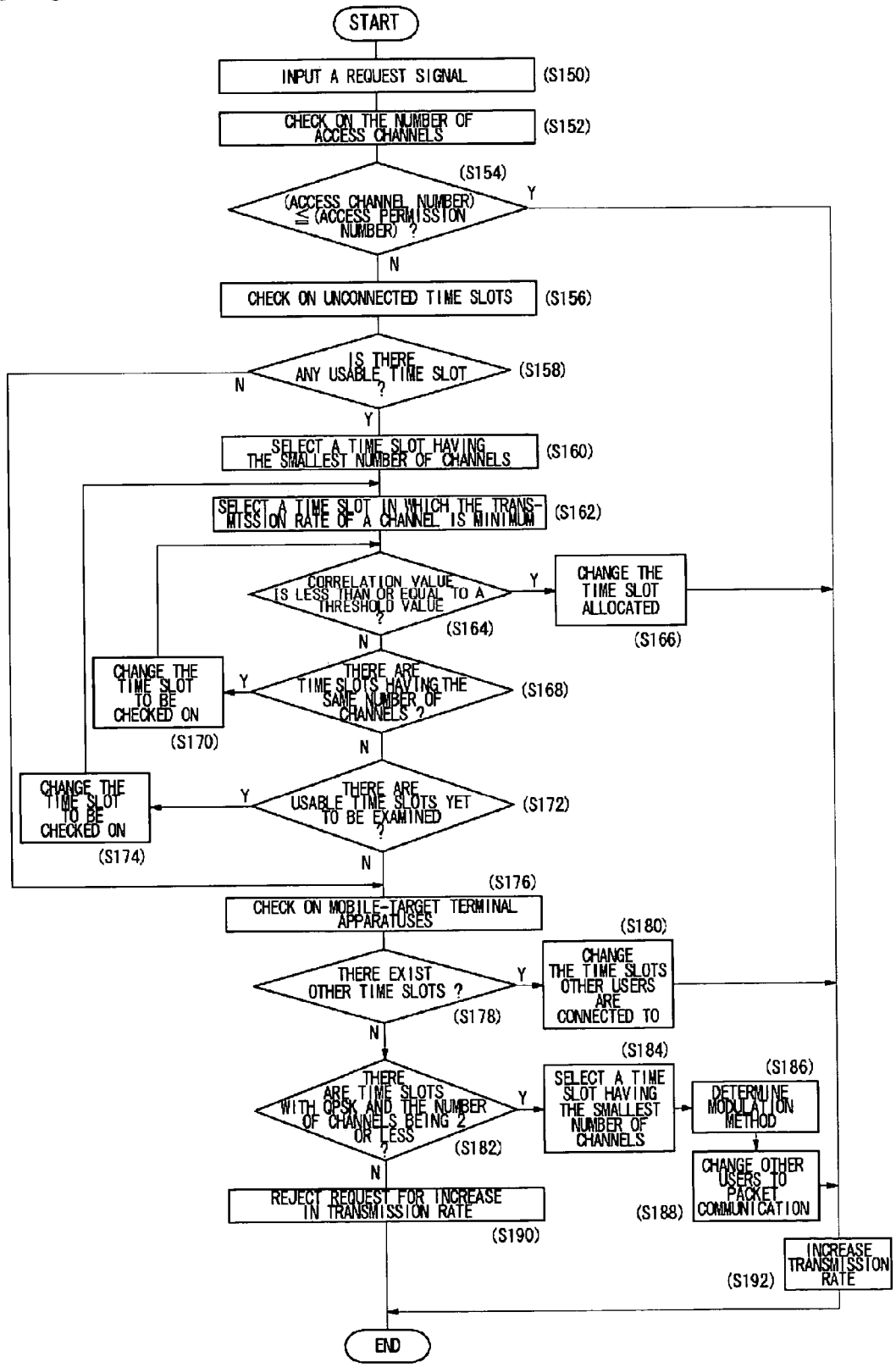
FIG. 19 is a flowchart showing a procedure for allocating channels according to a fourth embodiment of the present invention.

FIG. 19 shows a procedure for changing the transmission rate according to an increase requesting terminal apparatus. The steps up to step 180 are identical to those shown in FIG. 13 and the description thereof is omitted here. The channel allocating unit 216 further checks all the time slots to find time slots in which the modulation method is QPSK and the number of existing channels is 2 or less by referring to the channel management unit 220. And if there is any such a time slot (Y of S182), the channel allocating unit 216 selects the time slot which has the smallest number of channels in the applicable time slot (hereinafter referred to as "shared time slot") (S184). Even when one channel in the shared time slot is used in turn by the already allocated terminal apparatus 26 (hereinafter referred to as "existing terminal apparatus") and the mobile-target terminal apparatus, the modulation method for the existing terminal apparatus and the mobile-target terminal apparatus is determined in such a way as to retain the data transmission rate of the existing terminal apparatus (S186) and the mobile-target terminal apparatus is connected in packet communication (S188). Thereafter, the data transmission rate of the increase requesting terminal apparatus is raised (S192). On the other hand, if there is no time slot in which the modulation method is QPSK and the number of existing channels is 2 or less (N of S182), the connection of the new terminal apparatus is rejected (S190).

According to the fourth embodiment, if a plurality of terminal apparatuses are multiplexed in the same time slot and even if the partition of space is not adequate then, it is highly possible that the request made by the increase-requesting terminal apparatus is satisfied by utilizing the packet communication.

Fifth Embodiment

In a fifth embodiment according to the present invention, a radio apparatus adapted to the SDMA in the first to fourth embodiments is applied to a MIMO (Multiple Input Multiple Output) system. In the radio apparatus according to the fifth embodiment, the number of channels that permit the channel allocation (hereinafter referred to as "the set-up number") is determined according to a transmission rate per channel. Namely, the smaller set-up number is set with the purpose of reducing interference when the data transmission rate is high in units of channel. This is because the degradation of data transmission quality generally becomes more severe due to the interference. On the other hand, since the degradation thereof is smaller when the data transmission rate is low in units of channel, the larger set-up number is set then with the purpose of increasing the data transmission rate.

Here, a base station apparatus and a terminal apparatus in the MIMO system are each equipped with a plurality of antennas, and a channel suitable for each of the antennas is set. Namely, the channel of up to the maximum number of antennas is set for the communication between the base station apparatus and the terminal apparatus, so as to improve the data transmission rate. It is to be noted here that the channel between the base station apparatus and the terminal apparatus is generally separated by the use of the adaptive antenna technology. The plurality of terminal apparatuses in the above-mentioned SDMA corresponds to the plurality of channels in the MIMO system.

In order to achieve the objectives of the present invention, there is provided a radio apparatus which reduces the degradation of the data transmission quality in the case when the data transmission rate per channel is high. Moreover, provided is a radio apparatus which adjusts the data transmission rate in the terminal apparatus while reducing the degradation of the data transmission quality with the MIMO system.

The fifth embodiment relates to a communication system of a type shown in FIG. 1. Similar to the radio apparatus 10, the terminal apparatus 26 is equipped with a plurality of antennas and so forth. The first signal processing unit 14*a* to the M-th signal processing unit 14*m* process channels in which the space is partitioned, up to M channels, for a single terminal apparatus 26. Any of structures shown in FIGS. 4 to 6 is effective as a structure for this first radio unit 12*a*. The structure shown in FIG. 7 is effective as that of the first signal processing unit 14*a*. The structure shown in either FIG. 8 or FIG. 9 is effective as that of the rising edge detector 66. The structure shown in FIG. 10 is effective as that of the received weight vector computing unit 70. The structure shown in FIG. 11 is effective as that of the received response vector computing unit 200.

Figure 20:
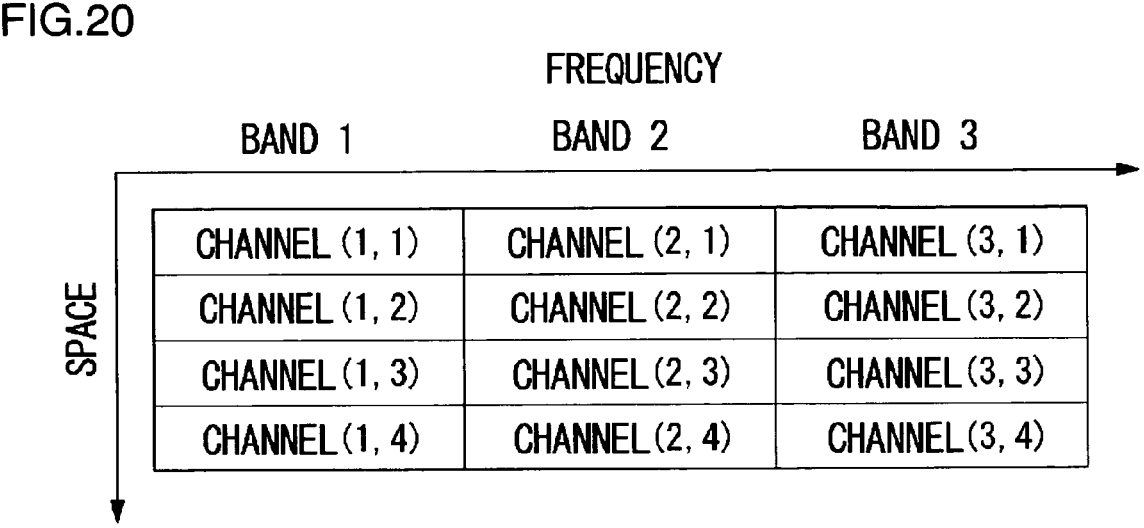
FIG. 20 shows a channel allocation according to a fifth embodiment of the present invention.

FIG. 20 shows a channel allocation according to a fifth embodiment. Here, the number of channel for the space axis by MIMO is 4 and the number of channel for the frequency axis by FDMA, that is, the number of band is 3, so that the total of 12 channels containing channel (1, 1) through channel (3, 4) are arranged. In FIG. 3, no distinction was made between the up-link and the down-link. The channels may be provided in the direction of time axis or the like.

Figure 21:
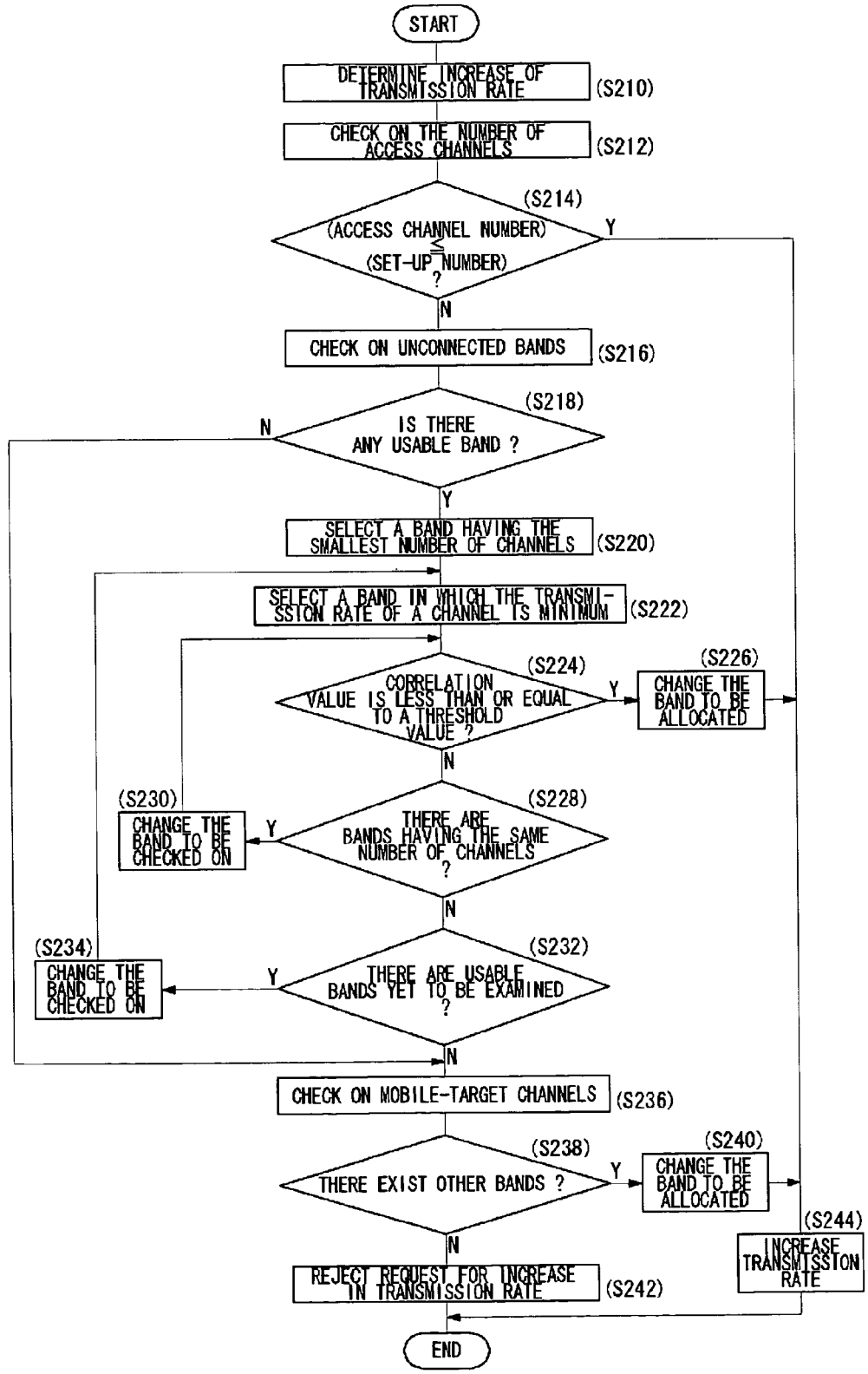
FIG. 21 is a flowchart showing a procedure for allocating channels according to the fifth embodiment.

FIG. 21 is a flowchart showing a procedure for allocating channels according to the fifth embodiment. FIG. 21 corresponds to a processing of FIG. 13 in SDMA, and shows a procedure for increasing the data transmission rate in accordance with the decision on the increase of the transmission rate. The channel allocating unit 216 decides on the increase of the transmission rate for the terminal apparatus 26 to be communicated with (S210). Hereinafter, a modulation method in which the transmission rate has already been increased will be referred to as "demand modulation method". A request for the increase of the transmission rate is made via application software, for example. The channel allocating unit 216 checks on the number of channels which were already allocated in a band where the modulation method thereof is to be changed (hereinafter referred to as "connection band"), by referring to the channel management unit 220 (S212). Hereinafter, the number of channels which were already allocated in the connection band will be referred to as "connection channel number".

The channel allocating unit 216 compares the set-up number with the connection channel number, and if the connection channel number is less than or equal to the set-up number (Y of S214), then the method is changed to the demand modulation method so as to increase the transmission rate (S244). On the other hand, if the connection channel number is greater than the set-up number (N of S214), the number of channels and modulation method contained in all bands other than the connection bands are examined, respectively, by referring to the channel management unit 220 (S216). Hereinafter, one or all of said bands will be referred to as "unconnected band". The "unconnected band" indicates the band, other than the "connection bands", among the bands connected between the terminal apparatus 26 and the radio apparatus 10.

If there exists any unconnected band in which a channel can be allocated to the terminal apparatus 26 that adopts the demand modulation method (hereinafter referred to as "usable band")(Y of S218), the channel allocating unit 216 selects a band whose channel number is smallest among the usable bands (S220). If there are a plurality of usable bands selected then, a band in which the transmission rate in the channel is minimum (hereinafter referred to as "target band") is selected (S222).

The correlation computing unit 214 computes a correlation value of the received response vector 402 corresponding to the channels contained in the target band and the received response vector 402 corresponding to the increasing channels. And if the correlation value is less than or equal to a threshold value (Y of S224), the channel allocated to the terminal apparatus 26 is changed to the channel contained in the target band (S226). If the correlation value is not less than or equal to the threshold value (N of S224) and there exists any band having the same channel number as the target band (Y of S228) or there exists any usable band which has not been checked on (Y of S232), then a band to be checked is changed (S230, S234) and the above procedure is repeated with the thus changed band as the target band. If there is no unchecked usable band (N of S232), on the other hand, then the procedure goes on to the next step.

A check is performed to see whether or not the correlation values of the received response vectors 402 corresponding to channels other than those whose methods are to be changed in the connection band (hereinafter, one or all of the applicable channels will be referred to as "mobile-target channel") and the received response vectors 402 corresponding to the existing channels contained in the unconnected band are less than or equal to a threshold value (S236). If there is any unconnected band that satisfies the above conditions (Y of S238), then the mobile-target channel is changed to a channel contained in the applicable unconnected bands (S240). On the other hand, if there is not any (N of S238), the request for an increase in data transmission rate is rejected (S242).

Figure 22:
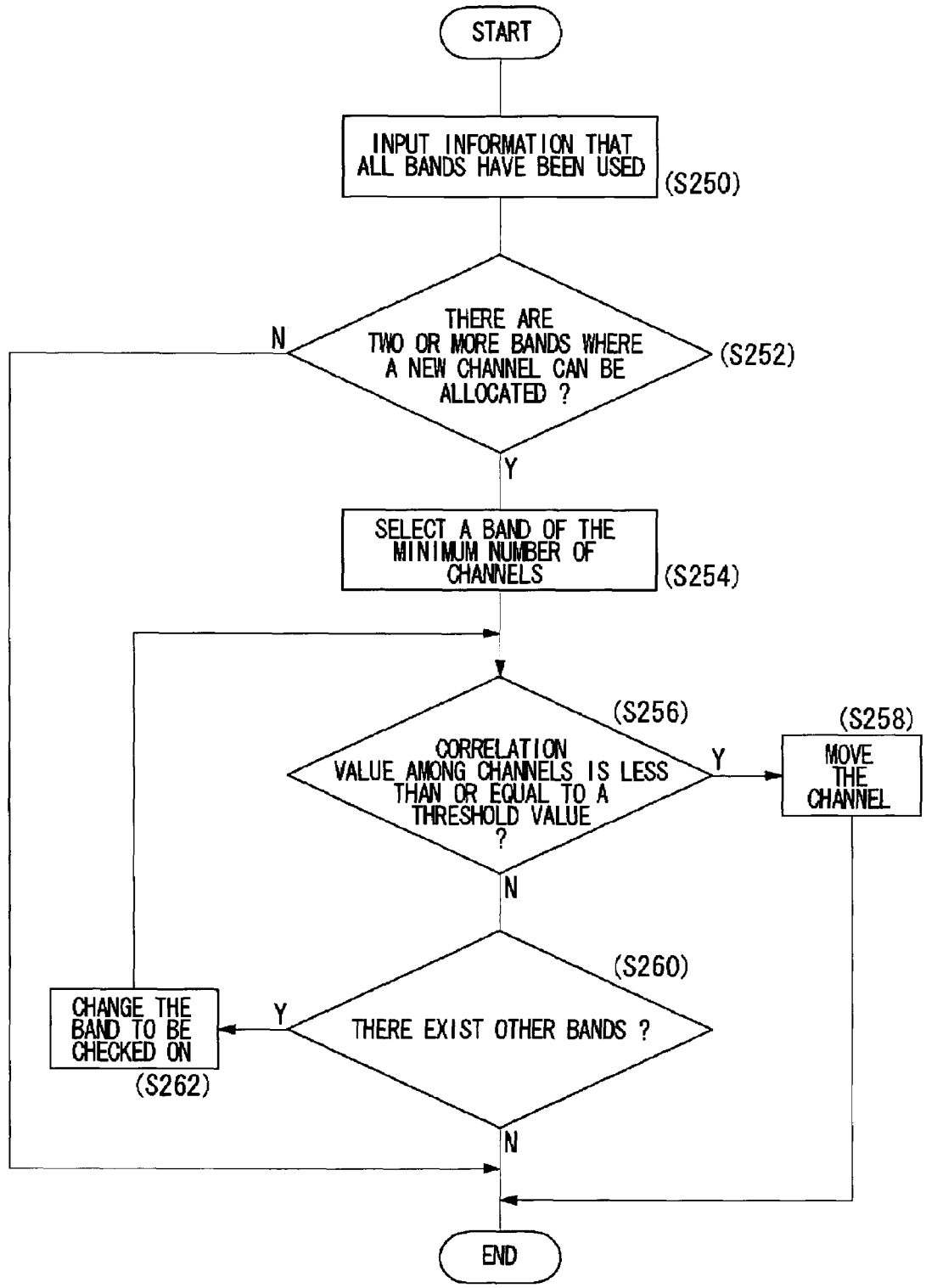
FIG. 22 is a flowchart showing another procedure for allocating channels according to the fifth embodiment.

FIG. 22 is a flowchart showing another procedure for allocating channels according to the fifth embodiment. FIG. 22 corresponds to FIG. 15 in SDMA, and shows a procedure for changing the channel allocation. The channel allocating unit 216 shown in FIG. 12 inputs information that channels have been allocated in all the bands from the channel management unit 220 (S250). The channel allocating unit 216 checks by referring to the channel management unit 220 to see whether there are two or more bands, from among all the bands, where a new channel can be allocated (hereinafter referred to as "usable band"), that is, whether there are two or more bands where the number of channels to which a terminal apparatus 26 is allocated is smaller than the set-up number. If there is not any (N of S252), the procedure is terminated, but if there are (Y of S252), the usable band where the number of channels is the smallest is selected (S254). Hereinbelow, the usable band thus selected is referred to also as "target band," and the one not selected is referred to as "untargeted band".

The correlation values of the received response vectors 402 corresponding to the channels contained in the target bands and the received response vectors 402 corresponding to the channels contained in the untargeted bands are computed. And if the correlation value is less than or equal to a threshold value (Y of S256), a channel in the untargeted band is allocated to the channel contained in the target band (S258). If the correlation value is not less than or equal to the threshold value (N of S256) and there is any untargeted band which is not the target band (Y of S260), the target band is changed (S262) and the above processing is repeated. On the other hand, if there is no untargeted band which is not the target band (N of S260), the processing is terminated.

FIG. 23 is a flowchart showing a still another procedure for allocating channels. The channel allocating unit 216 decides on the increase of the transmission rate for the terminal apparatus 26 to be communicated with (S280). The correlation computing unit 214 computes a correlation value of the received response vector 402 corresponding to the channels contained in the target band and the received response vector 402 corresponding to the increasing channels. And if the correlation value is less than or equal to a threshold value (Y of S282), the MIMO-method channel having the same frequency and time is allocated, so that a channel dividing the space is allocated (S284). If, on the other hand, the correlation value is not less than or equal to the threshold value (N of S282), a channel having a different band is allocated (S286).

An operation for the radio apparatus 10 structured above corresponds to the operation for the radio apparatuses 10 according to the first to third embodiments. So far described is the decision made, in the radio apparatus 10, on the channel number and data transmission rate thereof. However, the change in the data transmission rate or the like determined in the radio apparatus 10 must be notified to the terminal apparatus 26 in the actual setting. The notifying method therefor may be arbitrary. For example, a predetermined control signal may be used. If such a control signal is not to be used, the data may be transmitted starting at a low data transmission rate and, thereafter, the data transmission rate may be gradually increased as long as an acknowledgement signal (ACK signal) is being received. The same scheme may be applied to the case of the change in the data transmission rate and the like determined in the terminal apparatus 26.

According to the fifth embodiment, the channel set-up number is set low if there is a channel or channels whose transmission rate per channel is high, whereas the channel set-up number is set high if there is a channel or channels whose data transmission rate per channel is low. Thus, the degradation of data transmission rate can be suppressed to the minimum when the data transmission rate per channel is high, whereas the data transmission rate in all the channels can be made higher when the data transmission rate per channel is low. Moreover, a radio apparatus is provided which reduces the degradation of data transmission quality when the data transmission rate per channel is high in MIMO systems. Furthermore, a radio apparatus is provided which is suitable for handling the case where degradation of the data transmission rate due to MIMO is markedly large.

The present invention has been described based on the embodiments which are only exemplary. It is understood by those skilled in the art that there exist other various modifications to the combination of each component and process described above and that such modifications are encompassed by the scope of the present invention.

In the first to third embodiments, the control unit 20 changes the modulation method in order to change the data transmission rate. However, the data transmission rate may be changed using a factor other than modulation method. For example, the coding rate for error correction may be varied. In this modified example, by combining the change of modulation method and the variation in coding rate the data transmission rate can be regulated in a further detailed and precise manner. That is, it is acceptable if the data transmission rate takes a plurality of values.

In the first to third embodiments, the control unit 20 carries out TDMA as a multiplexing technique other than SDMA and thus the channels are allocated in the time slot. However, the multiplexing technique to be applied may be other than TDMA. For example, if FDMA or CDMA is used, then the time slots suitable therefor are prepared. In this modified example, the SDMA can be combined with other various multiple access techniques. That is, it is acceptable if further increased number of terminal apparatuses 26 can be connected by combining other multiplexing techniques with SDMA.

In the first embodiment, the received weight vector computing unit 70 uses an adaptive algorithm for estimating the received weight vectors 308 whereas the received response vector computing unit 200 uses a correlation processing for estimating the received response vectors 402. However, processings other than those may be executed at the received weight vector computing unit 70 and the received response vector computing unit 200. For example, either the adaptive algorithm only or the correlation processing only may be performed at both the received weight vector computing unit 70 and the received response vector computing unit 200. In such a case, the received weight vector computing unit 70 and the received response vector computing unit 200 may be integrally structured. Moreover, an arrival direction estimation using an algorithm, such as MUSIC (MUltiple SIgnal Classification), which is different from the above-mentioned adaptive algorithm or correlation processing, may be executed. This modified example realizes a more detailed distinction between desired waves and undesired waves. In other words, it is acceptable as long as values by which a plurality of received signals can be separated are estimated in the signal processing with an adaptive array antenna.

In the third and fourth embodiments, a single channel is allocated in sequence among a plurality of terminal apparatuses when the space division by the adaptive array antenna is inadequate. In such a case, however, the channel allocation for a plurality of terminal apparatuses may be carried out by other schemes. For example, a single time slot may be further time-divided so as to allocate channels which are allocated to the plurality of terminal apparatuses, respectively. That is, it is acceptable as long as the degradation of transmission quality due to interference can be suppressed.

In the third and fourth embodiments, the control unit 20 checks on the channel allocation in SDMA for the terminal apparatus 26, and if not allocated, the control unit 20 carries out packet communication where a single channel is allocated in turn to a plurality of terminal apparatuses 26. However, this switching may be done by using other methods. For example, the values of correlation between a plurality of terminal apparatuses 26 are computed first, and then the multiple access techniques may be switched. That is, it is acceptable as long as both SDMA and a multiple access technique other than the SDMA are used.

In the fifth embodiment, the channel that divides the space is further multiplexed by FDMA. Similar to the first to fourth embodiments, however, the present embodiments are not limited thereto and the channel may be multiplexed by TDMA, for example. Moreover, it may be multiplexed by CSMA. In this modified example, MIMO can be combined with various multiplexing techniques. That is, it is acceptable if further increased multiplicity of channels are allotted by combining with MIMO.

Although the present invention has been described by way of exemplary embodiments, it should be understood that many changes and substitutions may further be made by those skilled in the art without departing from the scope of the present invention which is defined by the appended claims.

What is claimed is:

1. A radio apparatus, comprising:

a control unit adapted to allocate channels respectively for a plurality of terminal apparatuses by using space division multiplexing; and a signal processing unit adapted to perform a data transmission processing on received signals from the terminal apparatuses, wherein said control unit is adapted to determine the number of terminal apparatuses to which permission is given for access by using space division multiplexing, in accordance with the data transmission rate per channel of the terminal apparatus to be connected, said signal processing unit is adapted to compute a received response characteristic, based on a signal received from the terminal apparatus, said control unit comprises:

a correlation computing unit adapted to compute a value of correlation between received response characteristics corresponding to the plurality of terminal apparatuses multiplexed by a space division multiplexing access; and a channel allocating unit which has means for performing the space division multiplexing access, within a range of the number of terminal apparatuses to which permission is given for access, if the value of correlation is less than or equal to a threshold value and which has means for performing different multiplexing from the space division multiplexing access if the value of correlation is greater than the threshold value, there are arranged a plurality of channels to which the plurality of terminal apparatuses are respectively allocated within a plurality of slots which are provided by a different multiplexing access from the space division multiplexing access, and said control unit further comprises:

an input unit adapted to input a request by which to change a data transmission rate of a predetermined terminal apparatus; and a channel allocating unit adapted to instruct a change of the data transmission rate in a request-applied terminal apparatus and adapted to relocate the channels among different slots so that the number of channels allocated within the respective slots is less than or equal to the number of terminal apparatuses to which permission is given for access even if the data transmission rate in the request-applied terminal apparatus has been changed.

2. The radio apparatus according to claim 1, wherein said control unit is adapted to determine the number of terminal apparatuses to which permission is given for access in such a manner that the number is set smaller as the data transmission rate of the terminal apparatus becomes higher.

3. A radio apparatus, comprising:

a control unit adapted to allocate channels respectively for a plurality of terminal apparatuses by using space division multiplexing; and a signal processing unit adapted to perform a data transmission processing on received signals from the terminal apparatuses, wherein said control unit is adapted to determine the number of terminal apparatuses to which permission is given for access by using space division multiplexing, in accordance with the data transmission rate per channel of the terminal apparatus to be connected, said signal processing unit is adapted to compute a received response characteristic, based on a signal received from the terminal apparatus, said control unit comprises:

a correlation computing unit adapted to compute a value of correlation between received response characteristics corresponding to the plurality of terminal apparatuses multiplexed by a space division multiplexing access; and a channel allocating unit which has means for performing the space division multiplexing access, within a range of the number of terminal apparatuses to which permission is given for access, if the value of correlation is less than or equal to a threshold value and which has means for performing different multiplexing from the space division multiplexing access if the value of correlation is greater than the threshold value, there are arranged a plurality of channels to which the plurality of terminal apparatuses are respectively allocated within a plurality of slots which are provided by a different multiplexing access from the space division multiplexing access, and said control unit further comprises:

a channel allocating unit adapted to relocate the channels among different slots in a manner such that the number of channels is nonuniform among the different slots while the number of channels allocated within the respective slots is set to less than or equal to the number of terminal apparatuses to which permission is given for access.

4. The radio apparatus according to claim 3, wherein said control unit is adapted to determine the number of terminal apparatuses to which permission is given for access in such a manner that the number is set smaller as the data transmission rate of the terminal apparatus becomes higher.

5. A multiple-access method, comprising:

allocating channels respectively for a plurality of terminal apparatuses to be multiple accessed, by space division multiplexing; and performing a data transmission processing on the terminal apparatuses allocated respectively for the channels, wherein said allocating determines the number of terminal apparatuses to which permission is given for access based on the space division multiplexing, in accordance with the data transmission rate of the terminal apparatus, said performing a data transmission processing computes a received response characteristic, based on a signal received from the terminal apparatus, said allocating comprises:

computing a value of correlation between received response characteristics corresponding to the plurality of terminal apparatuses multiplexed by a space division multiplexing access; and multiple-accessing the plurality of terminal apparatuses, within a range of the number of terminal apparatuses to which permission is given for access, by the space division multiplexing access if the value of correlation is less than or equal to a threshold value and multiple-accessing the plurality of terminal apparatuses by a different multiplexing access from the space division multiplexing access if the value of correlation is greater than the threshold value, there are arranged a plurality of channels to which the plurality of terminal apparatuses are respectively allocated within a plurality of slots which are provided by a different multiplexing access from the space division multiplexing access, and said allocating further comprises:

inputting a request by which to change a data transmission rate of a predetermined terminal apparatus; and instructing a change of the data transmission rate in a request-applied terminal apparatus and relocating the channels among different slots so that the number of channels allocated within the respective slots is less than or equal to the number of terminal apparatuses to which permission is given for access even if the data transmission rate in the request-applied terminal apparatus has been changed.

6. The multiple-access method according to claim 5, wherein said allocating determines the number of terminal apparatuses to which permission is given for access in such a manner that the number is set smaller as the data transmission rate of the terminal apparatus becomes higher. number is set smaller as the data transmission rate of the terminal apparatus becomes higher.

7. A multiple-access method, comprising:

allocating channels respectively for a plurality of terminal apparatuses to be multiple accessed, by space division multiplexing; and performing a data transmission processing on the terminal apparatuses allocated respectively for the channels, wherein said allocating determines the number of terminal apparatuses to which permission is given for access based on the space division multiplexing, in accordance with the data transmission rate of the terminal apparatus, said performing a data transmission processing computes a received response characteristic, based on a signal received from the terminal apparatus, said allocating comprises:

computing a value of correlation between received response characteristics corresponding to the plurality of terminal apparatuses multiplexed by a space division multiplexing access; and multiple-accessing the plurality of terminal apparatuses, within a range of the number of terminal apparatuses to which permission is given for access, by the space division multiplexing access if the value of correlation is less than or equal to a threshold value and multiple-accessing the plurality of terminal apparatuses by a different multiplexing access from the space division multiplexing access if the value of correlation is greater than the threshold value, there are arranged a plurality of channels to which the plurality of terminal apparatuses are respectively allocated within a plurality of slots which are provided by a different multiplexing access from the space division multiplexing access, and said allocating further comprises relocating the channels among different slots in a manner such that the number of channels is nonuniform among the different slots while the number of channels allocated within the respective slots is set to less than or equal to the number of terminal apparatuses to which permission is given for access.

8. The multiple-access method according to claim 7, wherein said allocating determines the number of terminal apparatuses to which permission is given for access in such a manner that the number is set smaller as the data transmission rate of the terminal apparatus becomes higher.

* * * * *